US005644463A

United States Patent [19]

El-Sharkawi et al.

[11] Patent Number: 5,644,463

[45] Date of Patent: Jul. 1, 1997

[54] ADAPTIVE SEQUENTIAL CONTROLLER WITH MINIMUM SWITCHING ENERGY

[75] Inventors: Mohamed A. El-Sharkawi, Renton; Jian Xing, Seattle, both of Wash.; Nicholas G. Butler, Newberg, Oreg.; Alonso Rodriguez, Pasadena, Calif.

[73] Assignee: University of Washington, Seattle, Wash.

[21] Appl. No.: 312,389

[22] Filed: Sep. 26, 1994

Related U.S. Application Data

[63] Continuation-in-part of Ser. No. 963,692, Oct. 20, 1992, Pat. No. 5,361,184.

[51] Int. Cl.[6] .......... H02H 3/00

[52] U.S. Cl. .......... 361/94; 361/2; 361/7; 361/78

[58] Field of Search .......... 361/2, 3, 5–7, 361/9, 78, 79, 83, 85, 88, 93; 364/483

[56] References Cited

U.S. PATENT DOCUMENTS 5,119,260 6/1992 Huhse et al. .......... 361/2

OTHER PUBLICATIONS

A. Holm et al., "Development of Controlled Switching of Reactors, Capacitors Transformers and Lines," Cigre, 1990 Session, 26 Aug. – 1st Sep., 10 pp.

R. Alvinsson et al., "Switching to lower transients," Transmission & Distribution, Mar. 1991, pp. 41, 43 & 45.

R. Alexander, "Synchronous Closing Control for Shunt Capacitors," 1985 IEEE, 85 WM 221–7, pp. 1–7.

ABB HV Switchgear, "Switchsync Relay for synchrounous circuit switching" Brochure, Publ. SESWG/B 2001 E, Edition 2, 1991–06, 4 pp.

Joslyn Hi–Voltage Corporation, VBU Faultmaster® Interrupter including Zero Voltage Closing Control Instruction Manual, D.B. 750–201, May 1986, 28 pp.

R. Wolff, "Control of capacitor closing nips surges," *Electrical World*, Transmission/Dustribution, Jan. 1, 1979, 6 pp.

N. Witteberg, Westinghouse ABB Power T & D Company publication, "Smooth Energizing of Capacitor Banks," NESA Distr., Aug. 1989, 12 pp.

*Primary Examiner*—Jeffrey A. Gaffin
*Assistant Examiner*—Sally C. Medley
*Attorney, Agent, or Firm*—Ronald M. Anderson

[57] ABSTRACT

An adaptive sequential controller (480) for controlling a single-phase circuit breaker, multiple circuit breakers in a multi-phase configuration, or a multi-phase circuit breaker to substantially eliminate transients upon closing the circuit breaker and to minimize switching energy when the circuit breaker for any phase of the line is open. The device adaptively compensates for changes in the response time of the circuit breaker due to aging and environmental affects. To control the circuit breaker so that is closes at a zero crossing of the voltage waveform, the adaptive sequential controller includes a potential transformer (70) that is connected to the distribution line. The potential transformer provides a reference signal corresponding to the zero crossing or zero instance of the voltage waveform. If the power factor of the load coupled to the line is known and remains relatively constant, a current transformer is not required. In multi-phase systems with imbalanced and varying loads, a potential transformer and current transformer may be required for each phase so that the power factor of the load can be determined. The response time of the circuit breaker is determined by monitoring an auxiliary switch in the circuit breaker that is coupled to the main breaker contacts. Based upon the response time that was last measured, the adaptive sequential controller responds to an open or close external command to apply the appropriate compensation for the delay of the circuit breaker opening and closing coils so that the circuit breaker closes at a selected time during the periodic voltage waveform and opens at a time appropriate to minimize the switching energy.

50 Claims, 25 Drawing Sheets

AMB. TEMP. SENSOR
HUMIDITY SENSOR
BAROMETRIC PRESS. SENSOR
MUX
A–D
CPU
ROM
V9
+15V DC
Vcc
CLOCK
RESET
GND
V4
V5
TO FIG.5B.
109
172
174
176
178
180
182
184
186
188
190
194
196
198
108
106
170
168
162
160
158
156
166
164a
164b
154
152
148
128
114
104
98
L1
L2
L3
150a
150b
150c
150d
150e
150f
150g
150h
150i
150j

ADAPTIVE SEQUENTIAL CONTROLLER WITH MINIMUM SWITCHING ENERGY

RELATED APPLICATION

This application is a continuation-in-part application based on prior application, Ser. No. 07/963,692, filed on Oct. 20, 1992, now U.S. Pat. No. 5,361,184.

FIELD OF THE INVENTION

This invention generally relates to a switch control, and more specifically, to a control that enables a solenoid current supplied to actuate a high-voltage switch or circuit breaker in response to a command signal. Further, this invention was made at least in part with government support under grant number DE-BI79-92BP25768, and the government may have certain rights in the invention.

BACKGROUND OF THE INVENTION

Transmission and distribution lines often include solenoid actuated high-voltage switches and circuit breakers that are opened and closed in response to a remotely supplied signal, for example, a signal supplied from a system control center or substation control panel. Each time that a switch or circuit breaker opens or closes, the contacts within it may be subjected to deterioration due to arcing, particularly if the line current is interrupted at its peak or if the device is closed at the peak of the periodically varying voltage. Arcing can also produce radio frequency interference (RFI). More importantly, each time that a switch or circuit breaker opens or closes at a current or voltage peak, respectively, damaging transients may be generated on the line by the resulting arcing or prestrikes. For example, if the current in a line connected to a capacitor bank or to a capacitive load is switched, the voltage on the bus may momentarily collapse to zero and then begin to oscillate at high frequencies and at high magnitudes. Such transients can damage equipment connected to the line and are very undesirable.

Conventional switches and circuit breakers are not designed to open or close at times appropriate to minimize stress and arcing. Instead, once a switching command is issued, the devices begin to open or close immediately as current flows through their solenoid actuation circuits. By monitoring the voltage and current on a bus, it would be possible to delay enabling the current to the solenoid that actuates a switch or circuit breaker for an appropriate time interval so that the device actually opens when the current waveform is crossing zero and closes when the voltage waveform is crossing zero. The delay introduced in enabling the electrical current to the solenoid or other actuator of the switch or circuit breaker should therefore include the response time of the device in opening or closing, i.e., an appropriate time for the device to react after its actuator is energized to open or close the switch or breaker contacts. However, the response time of the operating mechanism in the switch or circuit breaker typically changes with use and over time. For example, the force developed by springs used in the operating mechanism tend to change with age and usage, and because of the influence of ambient environmental conditions, such as temperature, barometric pressure, and humidity. Thus, it is not practical to simply measure the response time of a switch or circuit breaker at the time of its manufacture to determine the timing of a switching operation, because after the device has been in operation for several years, its response time will have changed substantially.

The advantages of closing a circuit breaker when the voltage on the line crosses zero and opening the breaker when the current is zero are discussed in a paper entitled, "Switching to Lower Transients," by R. Avinsson and C. Solver, ABB HV Switchgear Corporation, Ludvika, Sweden (March 1991). To reduce transient disturbances caused by operating a circuit breaker to connect a capacitor bank to a 130 KV line used by a Swedish utility, a microprocessor-based device was developed to open and close the circuit breaker when the current and voltage on the line were such as to likely minimize transients. Since long term variations in the circuit breaker closing time were expected, the control device was designed to self adjust the closing and opening times to compensate for such changes. While enabling details are omitted from the paper, it appears that the microprocessor in this device compares the predicted closing (or opening) time with the actual closing (or opening) time and adjusts the predicted time next used to operate the circuit breaker by applying one-half of the measured error. The predicted time used in controlling the circuit breaker is referenced to either the voltage or current on the line. This approach adaptively controls the circuit breaker based on errors in the predicted closure time of the breaker for a purely reactive load, within an error range of ±1 ms; yet, it does not specifically detect transients caused by operation of the breaker and adaptively control the circuit breaker to eliminate such transients when the breaker is next operated. Other sources of delay in the onset or interruption of current flow through the circuit breaker that might give rise to transients or restrikes, such as environmental conditions, are thus not compensated by the ABB HV Switchgear Corp. circuit breaker control. Furthermore, the device does not seem capable of compensating a breaker when the phase angle between current and voltage on the line is not nearly ninety degrees, i.e., for other than a purely reactive load.

Clearly, a switch controller that compensates for changes in the response time of a switch or circuit breaker operating mechanism under all conditions of operation is desirable. The controller should be able to adapt to changes in the response time of the switching device caused by aging, for virtually any phase angle associated with a load, so that operation of the switching device is initiated at an appropriate time selected to ensure that current flow on the bus is actually enabled and interrupted by the device at near zero voltage and near zero current crossings, respectively, to substantially eliminate switching transients in subsequent switching operations. Further, the controller should compensate for ambient environmental conditions in determining the appropriate times at which to initiate switching operations without producing transients.

SUMMARY OF THE INVENTION

In accordance with the present invention, an adaptive sequential controller is defined for controlling a switching device to interrupt and enable electrical current flow through an alternating current (AC) power line. The adaptive sequential controller includes transformer means, couplable to the power line, for producing a timing signal indicative of a zero crossing of at least one of a periodically varying current and a periodically varying voltage on the power line. Switching-time sensing means, which are couplable to an auxiliary switch within the switching device, produce a response signal indicative of a time interval required for the switching device to open or close after being activated. Delay adjustment means, coupled to the switching-time sensing means to receive the response signal and coupled to the transformer means to receive the timing signal, are operative to produce a triggering signal relative to the timing signal, as a function of the response signal, when the externally produced command signal is received. Control means, coupled to the delay adjustment means to receive the triggering signal, produce control signals in response to the triggering signal. These control signals activate the switching device to cause it to enable and interrupt the electrical current flow through the power line. The triggering signal determines a time at which the control means produce the control signals for initiating interruption and enablement of electrical current flow through the power line by the switching device so as to adaptively compensate for changes within the switching device that affect its response time, and to ensure that the switching device opens and closes at a desired relative value of at least one of the periodically varying current and the periodically varying voltage on the power line.

The auxiliary switch opens and closes substantially in concert with primary contacts of the switching device. Any differences in operating times of the auxiliary switch and the primary contacts of the switching device are predefined, so that a response time of the auxiliary switch is indicative of the response time of the switching device.

In one preferred form of the invention, the control means and the delay adjustment means comprise a microcomputer that includes a memory in which are stored program instructions that control the microcomputer. Also stored in memory are the differences in operating times of the auxiliary switch and the primary contacts of the switching device.

The transformer means comprise both a potential transformer and a current transformer if the phase angle between potential and current on the power line is not known or is subject to variation. In this case, the control means determine the phase angle between the periodically varying current and voltage on the power line. The control means compensate for variations in the phase angle in producing the control signal to open and close the switching device.

The delay adjustment means produce the triggering signal at a time selected to minimize switching energy in the switching device. Alternatively, the triggering time is selected to minimize transients on the power line.

The adaptive sequential controller further comprises a normally-open relay that is disposed in series with and between the control means and the switching device and is closed by the control means before the control means produce the control signal to enable or interrupt electrical current flow through the power line. The normally-open relay protects against a failure of the switching means that would enable electrical current to flow in the power line other than in response to the switching command.

In one form of the invention, the transformer means comprise a potential transformer. The timing signal then comprises a voltage signal that is produced by the potential transformer. This voltage signal is indicative of zero crossings of the voltage on the power line.

The delay adjustment means are preferably coupled to the transformer means and to the switching-time sensing means to receive the timing signal and the response signal as light signals via optical fibers. Furthermore, the control means also receive the externally produced switching commands as light signals via an optical fiber. Consequently, the delay adjustment means and the control means are electrically isolated from possibly damaging externally produced electrical signals. In addition, a plurality of optical interfaces are provided for converting the light signals to electrical signals.

A further aspect of the invention is directed to a method for controlling a switching device disposed on a power line to ensure that primary contacts of the switching device open and close at desired points in one of a periodically varying electrical current and a periodically varying voltage of the power line. The steps of the method are generally consistent with the functions of the elements comprising the adaptive sequential controller discussed above.

The foregoing aspects and many of the attendant advantages of this invention will become more readily appreciated by reference to the following detailed description, when taken in conjunction with the accompanying drawings.

BRIEF DESCRIPTION OF THE DRAWINGS

FIG. 6B is a graph illustrating the signal waveforms used in the adaptive sequential controller after it is adjusted to use the compensation from FIG. 6A, thereby eliminating transients when the circuit breaker closes;

DETAILED DESCRIPTION OF THE PREFERRED EMBODIMENT

Figure 1:
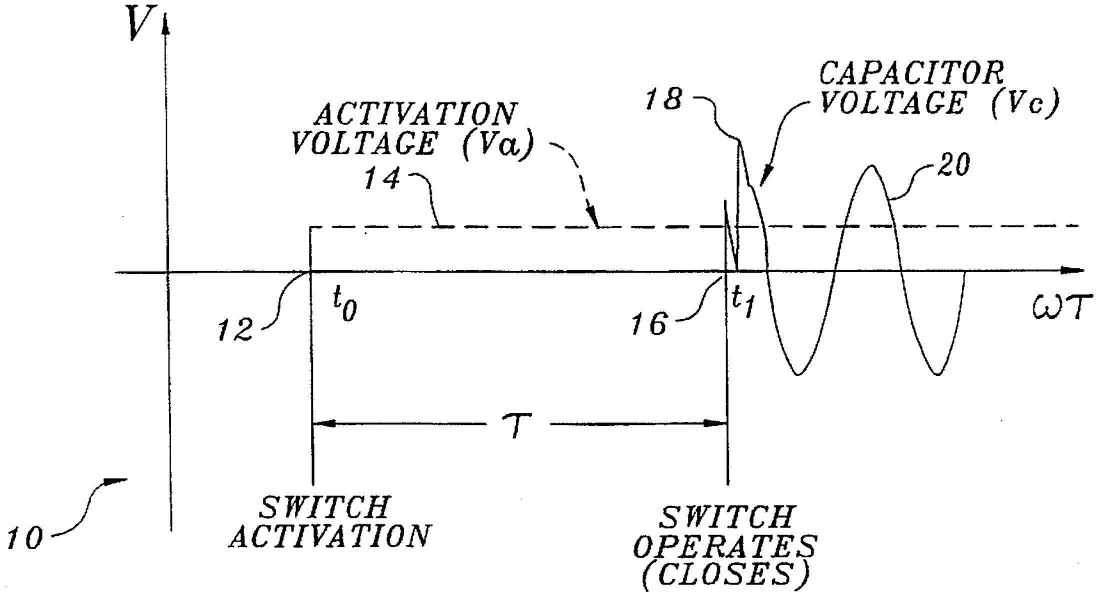
FIG. 1 is a graph of the voltage across a capacitor bank on a power line, illustrating the transient that is produced when a circuit breaker or switch is closed while the line voltage is near a peak value.

Referring to FIG. 1, a graph 10 illustrates the voltage transients that can be developed if a circuit breaker or switch on a high-voltage line connected to a capacitor bank is closed when the line voltage is substantially different than zero. In this example, the switch or circuit breaker is activated by an activation voltage signal $V_a$ applied to its solenoid at a time $t_0$, indicated by reference numeral 12. The time interval during which the circuit breaker activation voltage $V_a$ is supplied is indicated by a dotted band 14 on graph 10. The inherent time delay, $\tau$, of the circuit breaker or switch to respond to the activation voltage elapses at a time $t_1$, indicated by a reference numeral 16, at which point the switch or circuit breaker closes, applying a substantially non-zero line voltage to the capacitor bank load. The sudden application of a near peak line voltage to the capacitor bank causes a voltage transient and ringing to be developed across the capacitor bank. This transient has a maximum voltage amplitude 18, which can be much greater than the normal voltage for which the capacitor bank is rated. After the transient and ringing settle out, a generally normal sinusoidal voltage waveform 20 is evident. However, it is clearly desirable to avoid producing transients with an unacceptable maximum voltage amplitude 18. A more purely sinusoidal waveform can be achieved by activating the switch or circuit breaker closing mechanism at a time $\tau$ seconds prior to the zero crossing of the line voltage.

Figure 2:
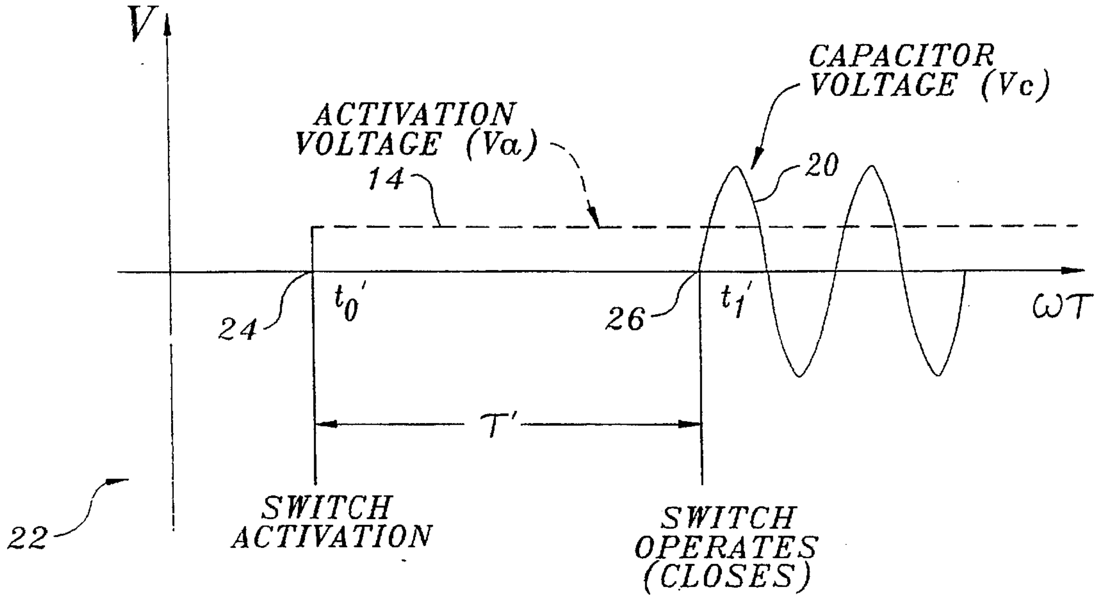
FIG. 2 is a graph of the voltage across a capacitor bank of a power line that is energized by closing a circuit breaker when the line voltage is substantially at a zero crossing.

Unfortunately, even if an appropriate compensation is applied for the inherent delay, $\tau$, of the circuit breaker or switch, changes in the value of $\tau$ due to the aging of the components that mechanically actuate the circuit breaker or switch, and environmental effects such as temperature, barometric pressure, and humidity, can introduce transients by causing the switch or circuit breaker to close at other than substantially zero line voltage. To accommodate changes in the inherent delay, $\tau$, of a circuit breaker or switch, adaptive compensation of the activation time, $t_0$, of the circuit breaker must be made. Accordingly, FIG. 2 shows a graph 22 wherein the benefit of adaptively compensating for a $\tau'$, changed relative to $\tau$, is illustrated. In graph 22, a switch activation voltage $V_a$ is applied at $t_0'$, as indicated by reference numeral 24. Again, the activation voltage $V_a$ indicated by dotted band 14 is applied over the indicated time interval, so that after the delay $\tau'$, the switch closes at a time $t_1'$, which is identified by a reference numeral 26. As a result of closing the circuit breaker or switch when the line voltage is substantially equal to zero, a normal sinusoidal voltage 20, without transients, is immediately applied across the capacitor bank. Elimination of the transient that was produced in the example illustrated by graph 10 is thus one of the most significant benefits derived from the adaptive operation of the circuit breaker or switch made possible by the present invention.

Figure 3:
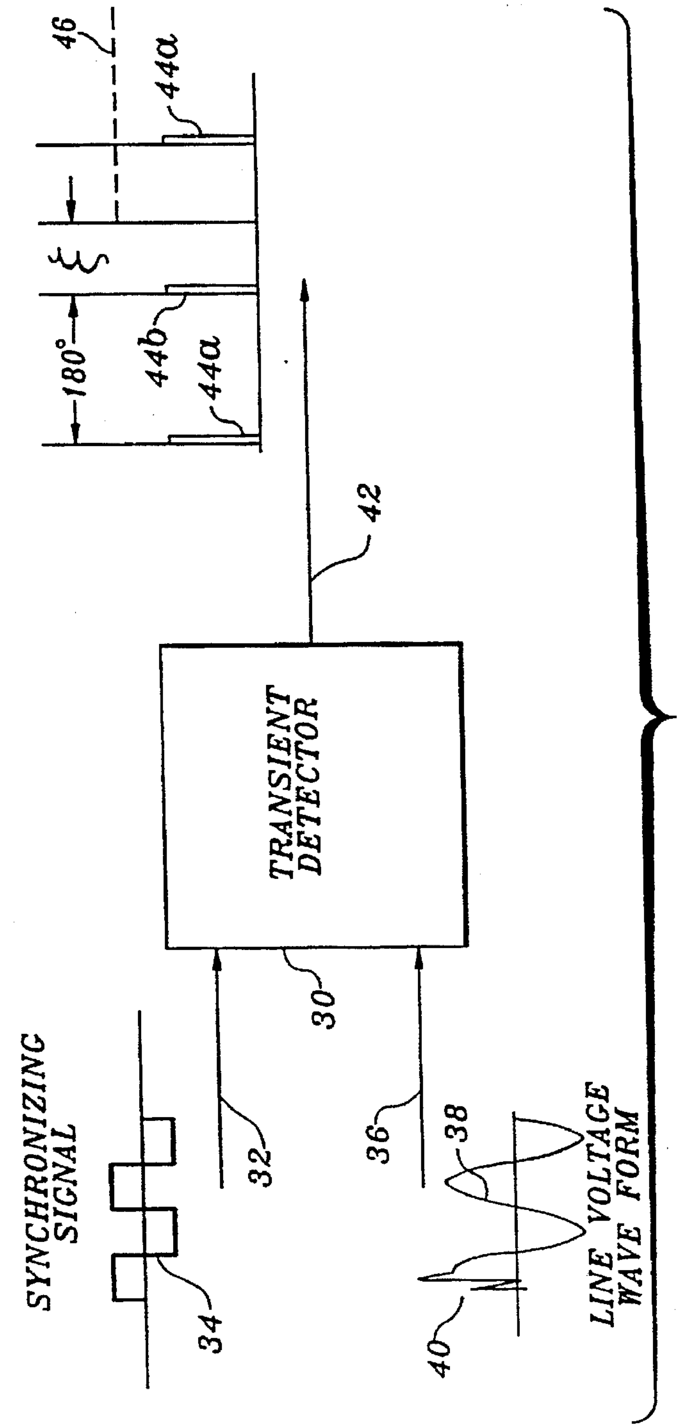
FIG. 3 is a schematic block diagram of a transient detector that determines an adaptive correction in the timing used for actuating a circuit breaker, based upon the time that a transient occurs with respect to a synchronizing signal.
Figure 5:
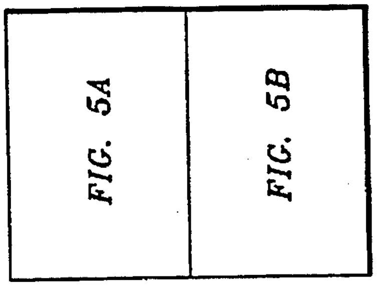
FIGS. 5A and 5B are an electrical schematic diagram of an environmental compensation circuit, the adaptive adjustment circuit, and a phase shift comparator of the adaptive sequential controller.

In order to adapt to a change in the value of $\tau$, i.e., a change in the delay interval alter an activation voltage is applied to a circuit breaker or switch before it closes or opens, the duration of the change must be determined by monitoring either the line voltage or the current flowing in the line to detect any transients that occurred when the circuit breaker or switch is activated. To determine a correction that should be applied to compensate for changes in $\tau$, it is necessary to determine at what point in time the circuit breaker or switch actually opened or closed with respect to a reference time. In one preferred embodiment, the reference selected is the voltage waveform. To provide better definition for the reference time, a square wave synchronizing signal 34 (as shown in FIG. 3) is developed that has a zero crossing synchronized to the zero crossing of a periodic sinusoidal voltage 38 on the power line. This synchronizing signal 34 is input through a line 32 to a transient detector 30 and compared with a line voltage transient signal 40, which is developed when the circuit breaker is closed at other than a zero voltage crossing of the line voltage, is applied to transient detector 32 through a line 36. Line voltage transient signal 40 defines when a transient occurred (which should only happen if the value of $\tau$ for the circuit breaker or switch changed from the last value used, or if the value was previously set to the wrong duration). Line voltage transient signal 40 thus indicates the actual closing time of the circuit breaker or switch and also indicates that the value of $\tau$ used in triggering the circuit breaker or switch should be adaptively changed to eliminate a transient on subsequent operations of the circuit breaker or switch.

An output signal 42 from transient detector 30 includes an indication of the error, $\xi$, by which $\tau$ must be adjusted to compensate for any change in the reaction time of the switch or circuit breaker. This error, which may be either a positive or negative value, is determined with respect to one of pulses **44*a*, which occur on the rising edge of synchronizing signal 34, or one of pulses 44*b*, which occur on the trailing edge of synchronizing signal 34, 180° after each pulse 44*a*. Thus, the time between either pulse 44*a* or pulse 44*b* and a transient pulse 46 determines the error, $\xi$. Transient pulse 46** is developed by differentiating a voltage signal to enlarge the relatively high frequency transient. The same arrangement can be applied for determining the circuit breaker or switch timing error with respect to opening of the circuit breaker or switch, which may be different than the timing error for closing it; opening of a circuit breaker or switch should occur only when the current flowing through the device is zero to substantially eliminate transients and restrikes. Closing the circuit breaker or switch when the voltage is substantially different than zero, or opening the circuit breaker or switch when the current through it is substantially different than zero typically produces a transient, indicating that adaptive compensation, due to changes in the value of τ, are required during the next such operation of the device in order to substantially eliminate such transients. Just as the transients can be determined by monitoring either the current or voltage on the power line, so can the reference for determining when to open such a device be developed either directly, by monitoring the zero crossing of current, or indirectly, by monitoring the zero crossing of voltage on the line and the phase angle between current and voltage so that the zero crossing of current is determined. If the phase angle between the current and voltage is known (assuming it is relatively constant) or if it is measured, the zero crossing of current is readily determined by applying the phase angle to the zero crossing of voltage.

Figure 4:
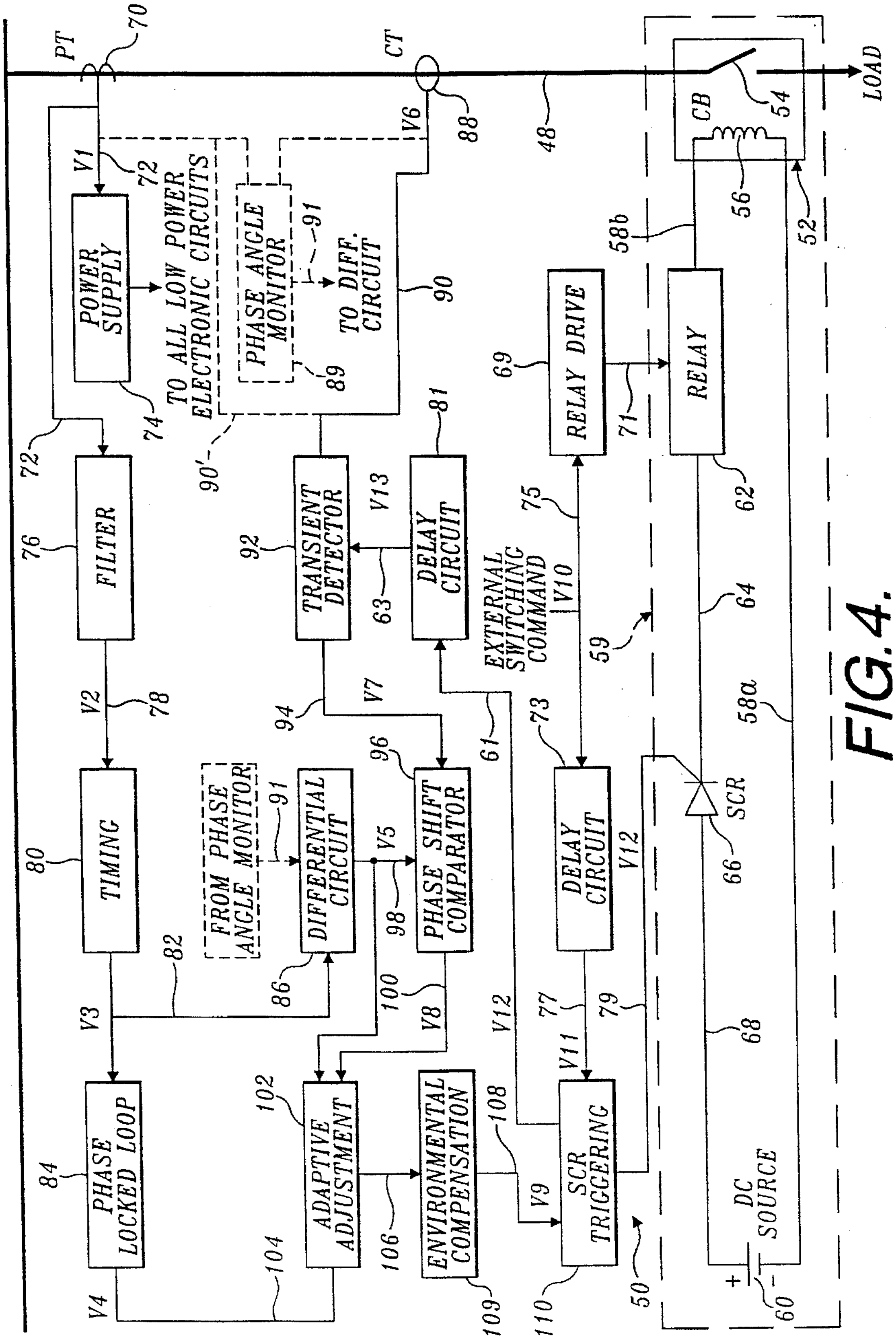
FIG. 4 is a schematic block diagram of an adaptive sequential controller for controlling the closure of a circuit breaker or switch in accordance with the present invention.

Referring now to FIG. 4, a block diagram of a first embodiment of adaptive sequential controller 50 that is used for controlling the opening or closing of a circuit breaker 52 in accordance with the present invention is shown. One adaptive sequential controllers 50 is used for opening circuit breaker 52, and another adaptive sequential controllers 50 is used for closing the circuit breaker to accommodate different reaction times for the opening and closing sequence. Circuit breaker 52 is installed on a distribution line 48 to control current flow to a load (not shown—disposed below or down line of the circuit breaker) and is illustrated as a single-phase device, but may also represent the circuit breaker for one phase of a multi-phase circuit breaker, each phase of which is separately controlled by a different solenoid coil 56. To accommodate differences in the phase angle between voltage and current on each phase of a multi-phase power line, i.e., for use with a multi-phase circuit breaker on an imbalanced power line, two separate adaptive sequential controllers 50 are required for each phase of the circuit breaker, one for controlling opening of the circuit breaker and one for controlling closing of the circuit breaker, or a total of six adaptive sequential controllers 50. Since the circuit breaker section for each phase is then separately controlled to compensate for the operating parameters of the circuit breaker section in opening or closing, differences in the angle between the phase voltages will not adversely affect the adaptive sequential controller operation.

On power lines with substantially balanced loads, e.g., transmission lines, it is possible to use adaptive sequential controller 50 to control opening or closing of all three phase sections of the breaker by supplying an appropriate 120 degree offset in the control signal for the solenoid that actuates each of the three different phases of the circuit breaker—either to open or close. The operation of the adaptive sequential controller is then referenced to only one phase, but controls all three.

Circuit breaker 52 is opened or closed each time that an activation voltage is applied across solenoid 56, through leads 58*a* and 58*b*. Lead 58*a* connects directly to the negative terminal of a DC source 60 that is remotely located, for example, in a substation control room (not shown). Lead 58*b* is connected to a relay 62, which is normally open. Current from DC source 60 flows via a lead 64 through relay 62, when it is closed, into lead 58*b*. Lead 64 is connected to the cathode of a silicon controlled rectifier (SCR) 66 and, when the SCR is triggered to a conductive state in response to a signal V12 from SCR triggering circuit 110 conveyed on a lead 79, carries current from DC source 60 to relay 62. The anode of SCR 66 is coupled to the positive terminal of the DC source through a lead 68. In the event that adaptive sequential controller 50 is used to control a plurality of phases on a multi-phase breaker (of which contacts 54 comprises only one phase section thereof) of a balanced load multi-phase line, a suitable predetermined delay is provided by SCR triggering circuit 110 in producing signals V12 for each of the other phases. For example, for a three phase power line 48, a predefined 120 degree delay would be provided by SCR triggering circuit 110 for each successive signal V12 used to control a corresponding SCR 66 on the other phases (not shown). Each circuit breaker section of the multi-phase circuit breaker is then actuated in sequence in response to the adaptive sequential controller, based on the zero voltage crossing of only one phase for closing, and based on the phase angle/zero current crossing for that one phase when opening the multi-phase circuit breaker.

In order for solenoid 56 in circuit breaker 52 to be energized to open or close the circuit breaker, relay 62 must be closed and SCR 66 must be activated to convey current from DC source 60. An external switching command, applied over a lead 75 through a relay drive 69 and a lead 71, energizes relay 62, which energizes solenoid 56 to initiate opening or closing of contacts 54 in circuit breaker 52. Delay circuit 73, which also receives the external switching command via lead 75, delays application of the switching command signal via a lead 77 to SCR triggering circuit 110 for a few milliseconds to ensure that relay 62 has closed before SCR 66 is turned on. By including relay 62 in series with SCR 66, any fault in SCR 66 (causing it to conduct current) is precluded from actuating circuit breaker 52 at times other than in response to the external switching command signal.

An alternating current (AC) line voltage signal V1 (120 volts) produced on the secondary of a potential transformer 70 is conveyed on leads 72 to a power supply 74 and to a filter 76. The power supply converts the relatively low voltage AC to appropriate DC voltages that are used to energize the electronic circuitry comprising adaptive sequential controller 50. Filter 76 removes substantially all of the harmonic distortion on the periodic AC signal, producing a substantially pure sinusoidal signal on a line 78, at the output of the filter.

Figure 6A:
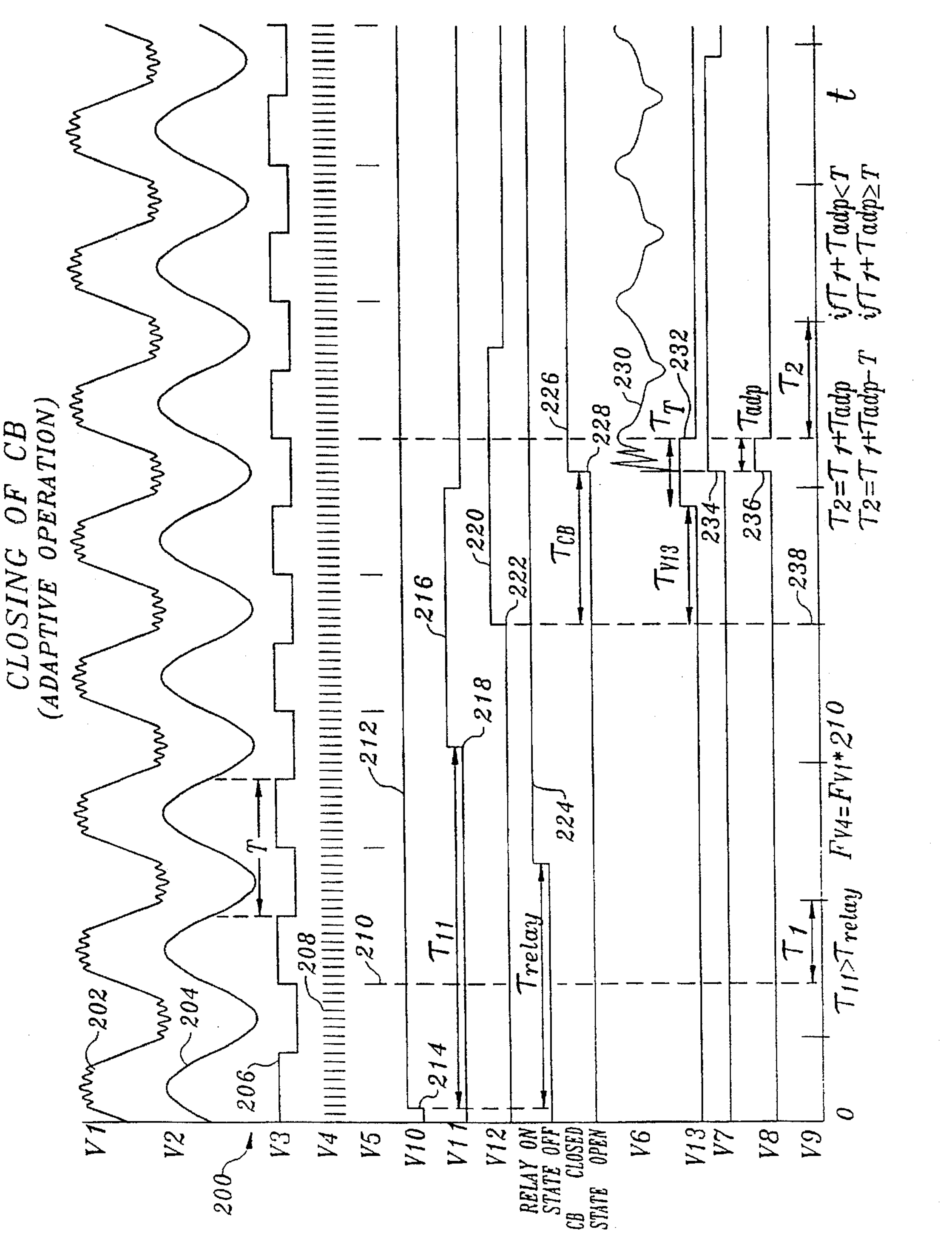
FIG. 6A is a graph illustrating the various signal waveforms used in the adaptive sequential controller for determining a compensation to control the closing of a circuit breaker to minimize transients.

Each of the signals used by adaptive sequential controller 50 during the process of determining a change in the value of τ that should be applied to compensate for changes in the operating time of the circuit breaker are shown in FIG. 6A. The signals are identified as V1 through V13 and in addition, include reference numbers identifying the specific pulses or waveforms. Thus, for example, line voltage signal V1 includes distorted peaks 202 prior to the removal of such distortion by filter 76, yielding a filtered line voltage signal V2 having an undistorted waveform 204.

The signal output from filter 76 is used by a timing circuit 80 that detects each zero crossing of the periodically varying sinusoidal waveform and produces a corresponding synchronizing signal V3, comprising a square wave 206 that has rising and falling edges corresponding to the time when filtered line voltage signal V2 crosses zero.

A synchronizing signal V3, comprising square wave 206, is input to a phase-locked loop circuit 84 and to a differential circuit 86. The phase-locked loop circuit produces a signal V4 comprising relatively high frequency pulses 208 (high frequency compared to the line frequency) that are phase-locked to 50/60 Hz square wave signal 206. The purpose of producing high frequency pulses 208 is to improve the resolution and definition with which the required adaptive adjustment in $\tau$ is determined. In the preferred embodiment, signal V4 has a frequency 1,024 times the frequency of square wave signal 206, e.g., 61.44 KHz for a 60 Hz square wave signal. It will also be understood by those of ordinary skill in the art that square wave signal 206 may be a 50 Hz signal, corresponding to the AC line frequency used by many utilities throughout the world, some other frequency that is derived from the line frequency. Furthermore, signal V4 can have a substantially different frequency than that used in the preferred embodiment, to achieve other levels of resolution.

Differential circuit 86 processes square wave signal 206, producing a positive going, zero-crossing voltage signal V5 comprising successive pulses 210 that are coincident with each a positive going, zero-crossing voltage (rising edge) of square wave 206. In other words, a pulse 210 is produced at the beginning of each cycle of square wave 206 to serve as a reference point for determining the actual time that circuit breaker 52 closes (and the required correction or adaptive change to apply, based upon the time at which any transients are produced).

Transients can be detected using the potential signal produced by potential transformer 70. Alternatively, a current transformer or potential transformer (neither shown) down line from circuit breaker 52 can be used for this purpose. In the preferred embodiment, the secondary of a current transformer 88 that monitors current flow through distribution line 48 is used to provide a current signal indicative of transients produced by closure of circuit breaker 52 at other than a zero potential on distribution line 48.

Lines 72 and 90 are connected to a phase angle monitor 89 that measures the phase angle between current and voltage on distribution line 48 to provide a phase angle signal carried on a line 91 that is connected to differential circuit 86. The phase angle signal is used in connection with adaptive control of circuit breaker 52 when it is to be opened, by enabling the zero crossing of current to be determined by reference to the zero crossing of voltage on the distribution line, as explained in greater detail below. If the load controlled by circuit breaker 52 represents a relatively constant phase angle, a phase angle control (not separately shown) provided in differential circuit 86 can be manually adjusted to the constant phase angle setting, producing a phase angle signal corresponding to the known phase angle between current and voltage on distribution line 48. The phase angle signal is combined with synchronizing signal V3 to produce signal V5, which is used to determine an appropriate time for activating the circuit breaker to open, coincident with the expected zero crossing of current (but actually referenced to the monitored zero crossing of voltage). Signal V5 is also input to adaptive adjustment circuit 102.

Current transformer 88 is connected by lead 90 to a transient detector circuit 92. A signal V6 produced by the secondary winding of current transformer 88 includes a transient in the first few ms of a current waveform signal 230 if circuit breaker 52 closes at other than the zero potential, indicating that a change in the value used for $\tau$ is required to compensate for changes in the operating time of circuit breaker 52. If circuit breaker 52 closes at a zero potential on distribution line 48, no transients are produced. Transient detector 92 responds to any high frequency transient that is produced (during a short time window, when it is appropriate to determine if adaptive compensation of $\tau$ is required), producing a signal V7 comprising a square pulse 234 having a rising edge that is coincident with the inception of any such transient and lasting about three cycles of the line frequency. Signal V7 is conveyed from transient detector 92 over a line 94 to a phase shift comparator 96. Alternatively, as noted above, signal V7 can be produced in response to any transients monitored using potential transformer 70 that are conveyed to transient detector 92 over a line 90' that is connected to the secondary of potential transformer 70.

Phase shift comparator 96 determines the relative phase angle (or time interval) between a rising edge 228 of a pulse 226, which indicates closure of circuit breaker 52, and the next successive pulse 210 produced by differential circuit 86. A signal V8 comprising a pulse 236 is thus output from phase shift comparator 96 over a line 100, which is coupled to the input of an adaptive adjustment circuit 102. The duration between the rising and filling edges of pulse 236 corresponds to a time, $\tau_{adp}$, which represents a required adjustment to the previous value used for compensating changes in the delay time of circuit breaker 52 that should be applied when circuit breaker 52 is next actuated.

An initial or previously determined compensation time, $\tau_1$, in connection with the value $\tau_{adp}$, is used by adaptive adjustment circuit 102 to determine the new compensation time $\tau_2$ that will next be applied to substantially eliminate any transients on distribution line 48. Adaptive adjustment circuit 102 determines the appropriate time to activate circuit breaker 52, compensated for changes in its response time, so as to substantially eliminate transients. This compensated time is output by adaptive adjustment circuit 102 on a line 106 that is coupled to an environmental compensation circuit 109. The environmental compensation circuit modifies the compensated time as appropriate to offset changes in the response time of circuit breaker 52 caused by ambient temperature, barometric pressure, and humidity. Environmental compensation circuit 109 produces a signal V9 that is conveyed on a line 108 to SCR triggering circuit 110. Signal V9 is a sequence of short pulses at spaced intervals that establish the rising edge of a gating signal V12. Signal V12 is applied over a line 79 to the gate of SCR 66 to trigger it into a conductive state so that the SCR will carry current to energize solenoid 56 and actuate circuit breaker 52.

Although signal V9 controls the timing for the rising edge of gating signal V12, the gating signal is only produced by SCR triggering circuit 110 upon receipt of a signal V11, which is conveyed from delay circuit 73, via a line 77, in response to external switching command signal V10. External switching command signal V10 is supplied from an external source each time that circuit breaker 52 is to be actuated and thus controls the circuit breaker, subject to the appropriate time delay dictated by signal V9. As noted above, external switching command signal V10 is also supplied via line 75 to relay drive circuit 69, which produces the signal to activate relay 62, closing it to enable activation of circuit breaker 52 in response to switching command signal V10. Relay 62 provides fail-safe control of circuit breaker 52, preventing it from being activated, for example, should SCR 66 fail in a short circuit condition.

Delay circuit 73 appropriately delays the external switching command signal V10, also applied to SCR triggering circuit 110, to provide sufficient time for relay drive 69 to close relay 62. The delay provided by delay circuit 73 prevents the SCR from attempting to actuate the circuit breaker before relay 62 has closed.

Figure 5A:
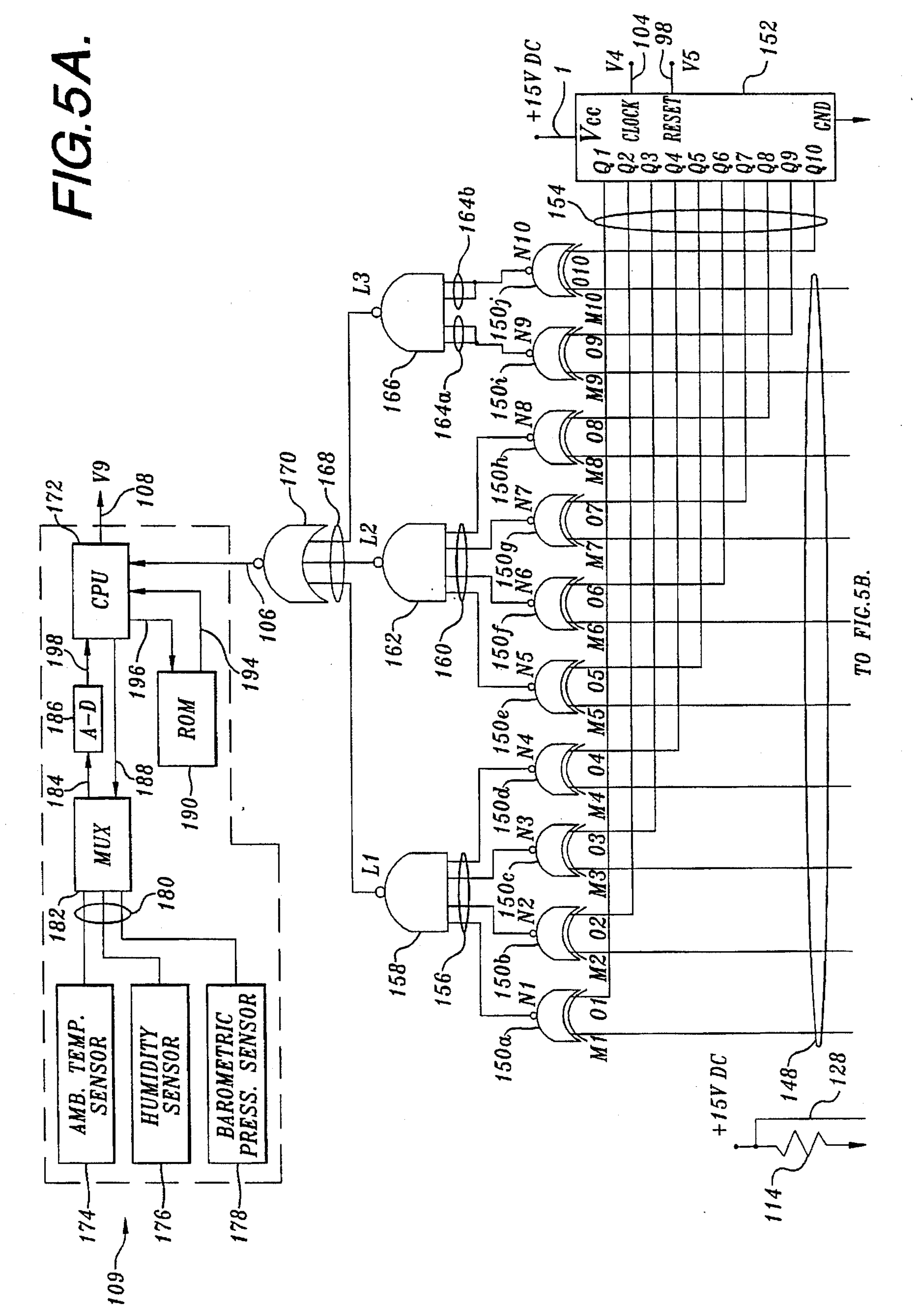
Figure 5B:
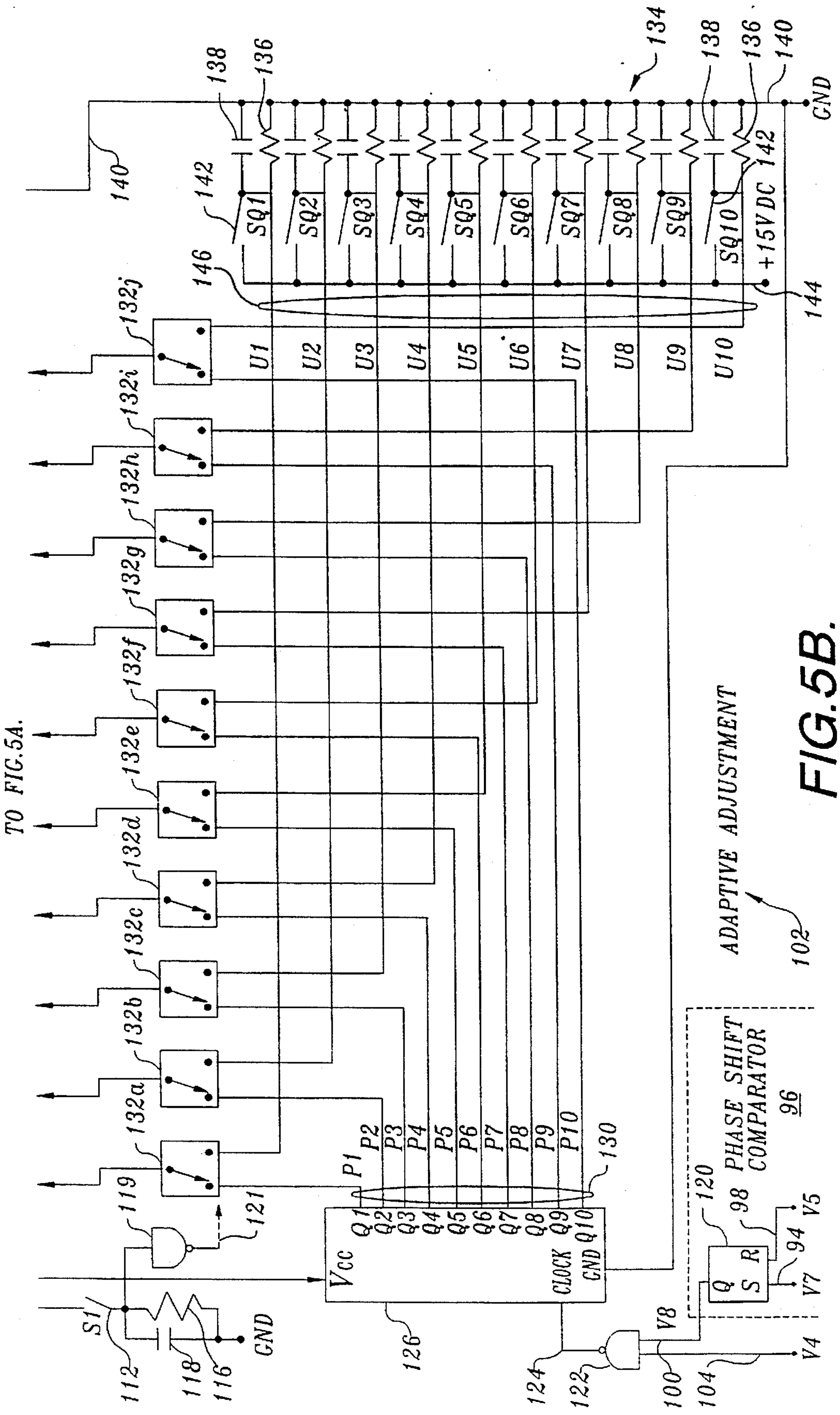

Details of adaptive adjustment circuit 102 are shown in FIGS. 5A and 5B. FIG. 5B also illustrates the principal component of phase shift comparator 96, i.e., a flip flop 120 having its reset terminal connected to line 98 to receive signal V5 and its set terminal connected to a line 94 to receive signal V7. In response to these two signals, the phase shift comparator produces signal V8 that is conveyed by line 100 to one input of a NAND gate 122. The other input of NAND gate 122 is connected to a line 104 to receive signal V4. The output of NAND gate 122 is connected by a line 124 to a clock terminal of a binary counter 126. When both signals V4 and V8 ($\tau_{adp}$) are high, a logic level low (binary zero) output signal is sent over line 124; otherwise, the input to the clock terminal is a logic level high (binary one).

Binary counter 126 accumulates a binary count of the high frequency dock pulses comprising signal V4 during pulse 236, a time interval equal to $\tau_{adp}$. However, the count accumulated by binary counter 126 is cumulative, representing the total of the prior value of the compensation time, $\tau_1$, and an appropriate adaptive correction. If the total exceeds a period, T, (the period of the line frequency), then the accumulated count in the binary counter starts over. The accumulated count is conveyed as a binary value (P1 through P10) on lines 130, each binary digit being input to a different one of ten bilateral switches 132*a* through 132*j*. The other input of each bilateral switch is connected by a line 146 to a different switch 142, identified as SQ1 through SQ10. The other side of switches 142 are connected to +15 VDC through a line 144. A set of resistors 136 are each connected in parallel with a corresponding number of capacitors 138 between a grounded line 140 and lines 146. Switches 142 enable manually setting the compensation time for circuit breaker 52. By selectively closing specific switches 142, an operator selects a preset binary count (U1 through U10) that serves as an alternative to use of binary counter 126, which adaptively determines the compensation time. The provision for manual entry of a compensation time is included to cover situations in which automatic adaptive compensation is not desired.

Bilateral switches 132 select either the adaptively determined count (P1 through P10) from binary counter 126 or the manually preset count (U1 through U10) from switches 142 in response to a control signal that is input to each bilateral switch over a line 121. The control signal that selects the cumulative count from binary counter 126 is applied at the output of an inverter gate 119 when a switch 112 is manually closed by an operator. One side of switch 112 is connected to a resistor 116 and a capacitor 118, which are connected in parallel to ground, and the other side of switch 112 is connected to one end of a resistor 114. The other end of resistor 114 is connected to +15 VDC through a lead 128. When switch 112 is closed, a logic level one is input to inverter gate 119; a resulting logic level zero on the output of inverter gate 119 causes bilateral switches 132 to select the inputs that are connected to receive the binary count P1 through P10 on binary counter 126. If switch 112 is opened, bilateral switches 132 respond to a resulting logic level one on line 121 by selecting the binary count U1 through U10, which is manually preset by closure of certain of switches 142.

The binary count selected by bilateral switches 132 is output on lines 148, each of which is separately connected to one input of a different exclusive NOR (XNOR) gate 150*a* through 150*j*. The other input of each XNOR gate is connected to a different one of ten terminals Q1 through Q10 on a binary counter 152 by lines 154. The clock terminal of binary counter 152 is connected to line 104 to receive signal V4, and the reset terminal is connected to line 98 to receive signal V5. Consequently, binary counter 152 is reset with each rising edge of signal V5 so that it accumulates the relatively high frequency pulses comprising signal V4. Each XNOR gate 150 produces a logic level one at its output only when both of its inputs are at the same logic level, i.e., the output signals from all of the XNOR gates are at logic level one only when the count from bilateral switches 132 equals the count from binary counter 152. In essence, the count accumulated in binary counter 126 determines the adaptively compensated time interval for use in controlling subsequent operations of circuit breaker 52, and the count accumulated by binary counter 152 provides a time reference for initiating operation of the circuit breaker with the adaptive compensation time interval developed by binary counter 126.

The output signals from XNOR gates 150*a* through 150*d* are applied to the four input terminals of a quad input NAND gate 158 over lines 156. Similarly, the output signals of XNOR gates 150*e* through 150*h* are applied to the four input terminals of a quad input NAND gate 162 over lines 160. Finally, the outputs of XNOR gates 150*i* and 150*j* are separately applied to two pairs of input terminals of a quad NAND gate 166 over lines 164*a* and 164*b*, respectively. The output signals of NAND gates 158, 162, and 166 are at a logic level zero only when all input terminals of the NAND gates are at a logic level one, i.e., when only the accumulated count of binary counters 126 and 152 are equal. To consolidate this logical condition, the output terminals of the three NAND gates are separately applied to the input terminals of a NOR gate 170 over lines 168. It should be apparent that the output signal of NOR gate 170 is a logic level one only when all of its input terminals are at logic level zero.

The signal output from NOR gate 170 is conveyed on line 106 to a central processing unit (CPU) 172 in environmental compensation circuit 109. The environmental compensation circuit comprises an ambient temperature sensor 174, a humidity sensor 176, and a barometric pressure sensor 178, all of which are connected by lines 180 to three inputs of a multiplexer (MUX) 182. MUX 182 sequentially selects each of the ambient temperature, humidity, and pressure sensors in turn to provide an input over a line 184, to an analog-to-digital (A-D) converter 186 in response to a control signal supplied from CPU 172 over a line 188. The selected input parameter, i.e., ambient temperature, humidity, or pressure, is converted to a digital value by A-D converter 186 and input to CPU 172 over a line 198.

CPU 172 responds to a program stored in a read only memory (ROM) 190 in carrying out the environmental parameter compensation of the signal output from NOR gate 170. Specifically, it uses each of the environmental parameters to determine an entry point into a look-up table stored in ROM 190, specifying the address of a value stored therein over address lines 196. The value from the table is returned to the CPU over data lines 194. This value is used to adjust the time interval between successive pulses that are produced by CPU 172 as a function of the signal from NOR gate 170, thereby producing pulses 238, which comprise signal V9. The values in the look-up table are empirically determined for a specific manufacturer and model of circuit breaker 52, based on the changes in the response time of the circuit breaker due to ambient temperature, humidity, and barometric pressure. Accordingly, signal V9 is adaptively adjusted not only to compensate for changes in the circuit breaker due to aging and use, but also for changes due to environmental conditions.

Signal V9 is input to SCR triggering circuit 110 over line 108 to determine when the rising edge of signal V12 occurs. From the previous discussion, it will be recalled that signal V12 gates SCR 66 into a conductive state. In addition to providing signal V12 to SCR 66, SCR triggering circuit 110 supplies signal V12, via a line 61, to a delay circuit 81. Delay circuit 81 develops a delay, $\tau_{V13}$, between the rising edge of signal V12 (or pulse 238 comprising signal V9) and the rising edge of time interval $\tau_T$ that defines a window during which any transient developed on distribution line 48 as a result of the operation of circuit breaker 52 is detected by transient detector 92. A pulse 232 extending over the time internal $\tau_T$ is supplied as an enabling signal V13 to transient detector 92, allowing it to respond to transients only during the time when such transients are likely to be developed, for example, as a result of the closure of circuit breaker 52 at other than a non-zero crossing point for the voltage on distribution line 48.

As represented in FIG. 6A, transient signal V6 is developed if circuit breaker 52 closes, when the closure occurred at other than a zero crossing of the voltage on distribution line 48, e.g., due to changes in the response time of the circuit breaker as a result of aging. In response to the transient signal, transient detector 92 produces signal V7 comprising a pulse 234, to indicate the time at which the transient started, and lasting for about three cycles of the line frequency. Since any such transient starts when the circuit breaker closes at other than a zero voltage crossing, signal V7 also indicates the actual time at which circuit breaker 52 closed. The difference between the time that the circuit breaker doses and the time when the voltage on distribution line 48 next crosses zero (indicated by signal V5) is used by phase shift comparator 96 to determine pulse 236, which corresponds to the adaptive time compensation, $\tau_{adp}$. This adaptive time compensation is supplied as signal V8 to adaptive adjustment circuit 102, which adjusts the timing for signal V9 as explained above. The adjustment in the timing between the two successive pulses 238 comprising signal V9 (a change caused by including $\tau_{adp}$) is evident in the interval with $\tau_2$ in FIG. 6A. Following the $\tau_{adp}$ adjustment, the interval between successive pulses 238 remains constant, as indicated in FIG. 6B, until another adjustment is needed.

Operation of circuit breaker 52 in response to this adaptive adjustment of the timing for initiating signal V12 is illustrated in FIG. 6B. In this figure, circuit breaker 52 as controlled by the present invention is closed as the voltage on distribution line 48 crosses zero. Consequently, signal V6 does not include any significant transient; instead, there is almost no variation between the first cycle of current waveform 230 and subsequent cycles. Since closure of circuit breaker 52 is coincident with the time that the voltage on distribution line 48 crosses zero and no transient is produced, the value of $\tau_2$ remains unchanged the next time that the circuit breaker is closed, if there is no change in circuit breaker operating time due to ambient conditions or aging.

As indicated at the bottom of FIG. 6A, the new compensation time $\tau_2$ (compared to a previous compensation time $\tau_1$) is determined as a function of $\tau_{adp}$ using one of two equations; the equation used is dependent upon the sum of $\tau_1$ and $\tau_{adp}$. Specifically, if $\tau_1+\tau_{adp}<T$ ( where T is one period of undistorted waveform 204), then $\tau_2=\tau_1+\tau_{adp}$. Conversely, if $\tau_1+\tau_{adp}\leqq T$, then $\tau_2=\tau_1+\tau_{adp}-T$. Adaptive adjustment circuit 102 is designed to apply the appropriate equation to determine $\tau_2$, based upon these criteria.

Figure 7:
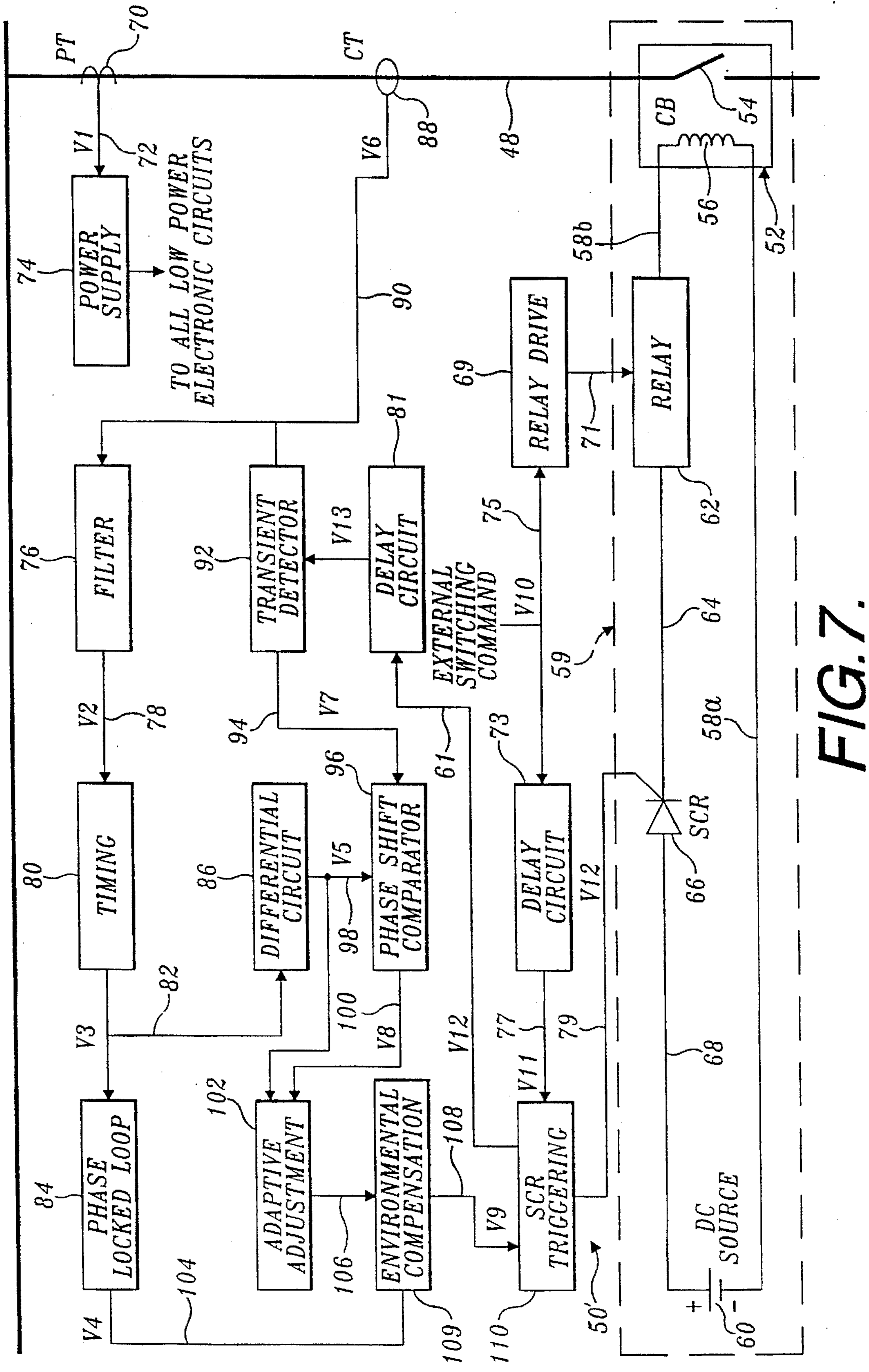
FIG. 7 is a schematic block diagram of the adaptive sequential controller used for minimizing current transients when opening a circuit breaker.

Details of the present invention as applied in a second embodiment to adaptively controlling only the opening of circuit breaker 52 so as to substantially eliminate transients are shown generally in FIG. 7, with respect to an adaptive sequential controller identified by reference numeral 50'. It should be apparent that the embodiment of FIG. 7 is similar to the block diagram in FIG. 4, with the exception that potential transformer 70 does not supply a signal V1 to filter 76 or transient detector 92, and, in addition, phase angle monitor 89 is not used. Instead, as shown in FIG. 7, current transformer 88 supplies signal V6 over line 90 to filter 76. Harmonic distortion present on signal V6 is substantially reduced by filter 76, and a filtered current signal is supplied as signal V2 over line 78 to timing circuit 80. At each zero crossing of the filtered current signal V2, timing circuit 80 produces square wave pulses 206, comprising signal V3. All other components of adaptive sequential controller 50' shown in block diagram FIG. 7 operate as described with regard to the like numbered components in FIG. 4, subject to the caveat that the adaptive compensation is developed to compensate for the response time of circuit breaker 52 after a signal is applied to solenoid 56 to open the circuit breaker, which may be different than the response time required for the circuit breaker to close after it is actuated. In addition, as already noted above, the adaptive sequential controller adjusts the time at which the solenoid is actuated so that the next time it is activated, circuit breaker opens when the current through distribution line 48 is passing through zero.

Figure 8A:
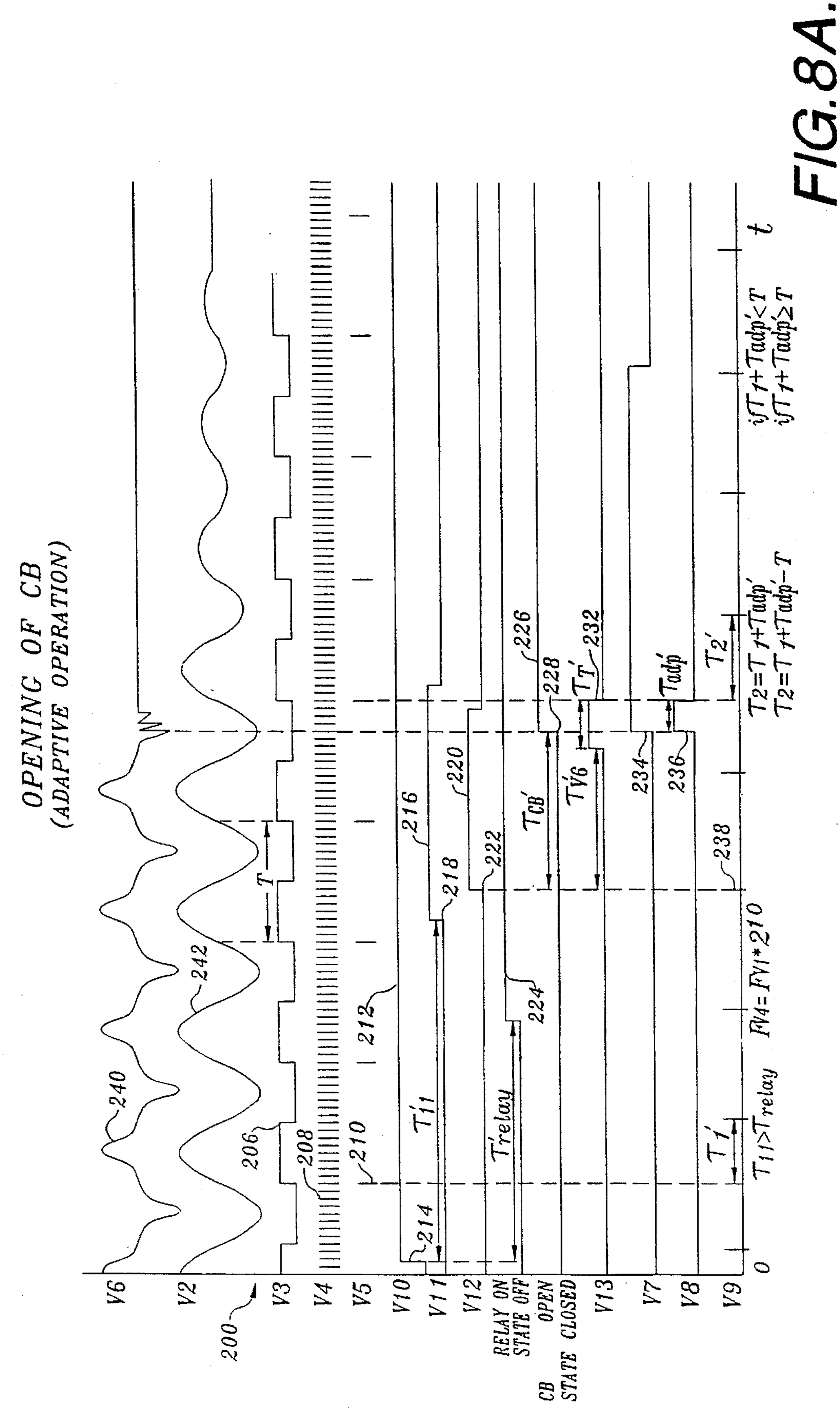
FIG. 8A is a graph illustrating signal waveforms used in the adaptive sequential controller for determining a compensation for controlling the opening of a circuit breaker to minimize transients.
Figure 8B:
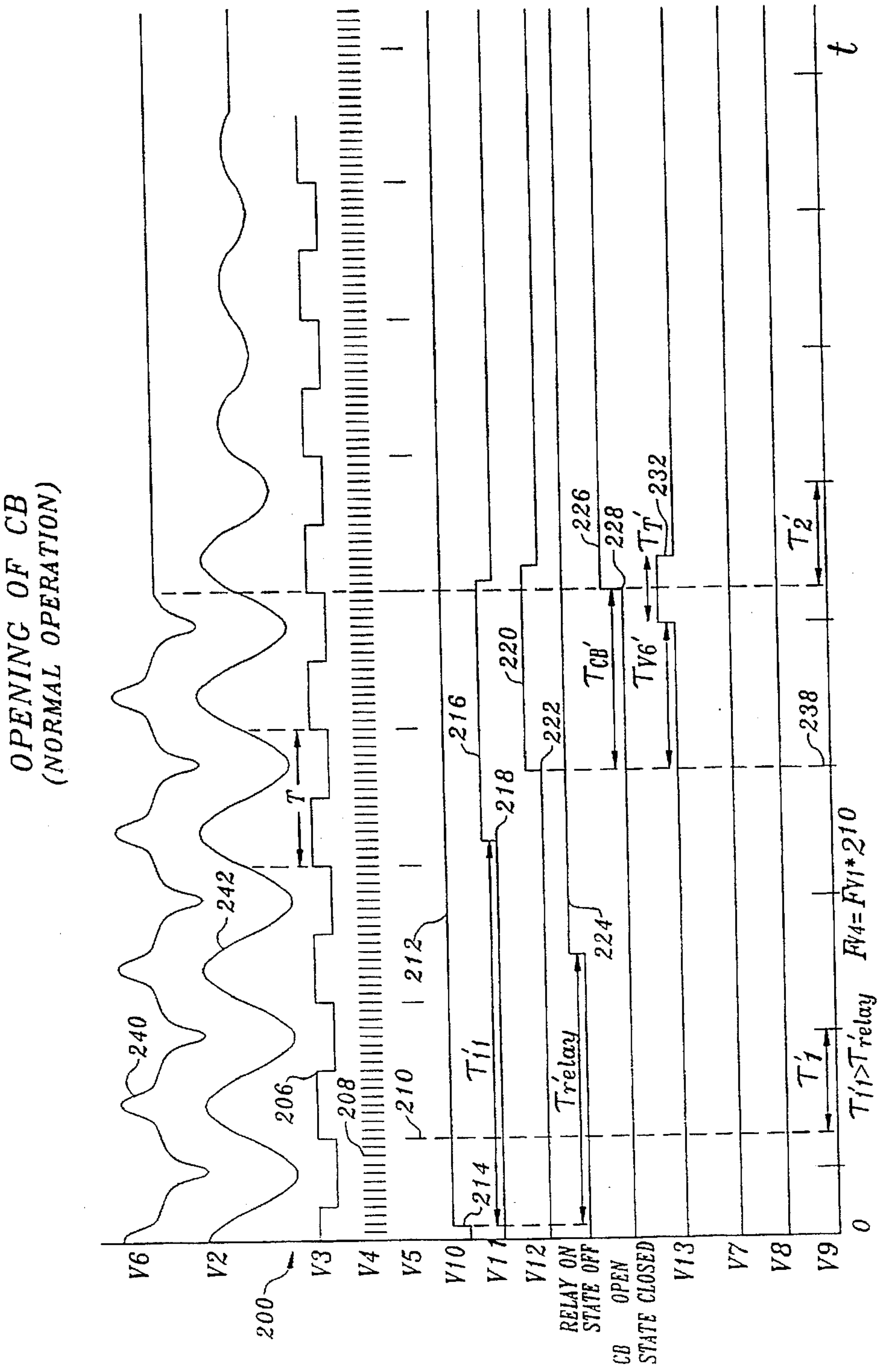
FIG. 8B is a graph illustrating signal waveforms used in the adaptive sequential controller after it is adjusted to use the compensation from FIG. 8A, thereby eliminating transients when opening a circuit breaker.

FIGS. 8A and 8B illustrate the various signals V2 through V13 developed by the components in FIG. 7 to provide adaptive control of circuit breaker 52 to substantially eliminate transients on distribution line 48 that would otherwise be caused by opening the circuit breaker when the current in distribution line 48 is not equal to zero. In FIG. 8A, the adaptive operation of the present invention is shown, illustrating how each of the signals developed determine a correction $\tau_{adp}'$, to compensate for a change in the response time of the circuit breaker as it opens. Adaptive sequential controller 50' can also be used to control one phase of multi-phase breaker on an imbalanced load power line or to control the opening of a plurality of phases of a multi-phase breaker on a balanced load power line.

As indicated by signal V6 in FIG. 8A, a significant transient disturbance is created when circuit breaker 52 opens while the current through distribution line 48 is near its maximum negative value rather than zero. Phase shift comparator 96 determines that an adaptive time interval, $\tau_{adp}'$, corresponding to the width of pulse 236 on signal V8 needs to be made so that the next time circuit breaker 52 opens, the default delay is increased by $\tau_{adp}'$. In FIG. 8B, this adjustment is made, resulting in circuit breaker 52 opening at substantially the point where current through distribution line 48 crosses through zero with a positive slope. As a result, transients on distribution line 48 are substantially eliminated.

As explained with respect to the block diagram shown in FIG. 4, circuit breaker 52 can be adaptively controlled to substantially eliminate transients on distribution line 48 caused by opening the circuit breaker, even though the zero crossing of current is not directly monitored. Instead, the zero crossing point of the voltage on distribution line 48 is monitored and the zero crossing of current is indirectly determined by using phase angle monitor 89. Phase angle monitor 89 produces a signal that is indicative of the phase angle between voltage and current on distribution line 48, and the signal is input to differential circuit 86 over line 91. In response, differential circuit 86 combines a time interval corresponding to the phase angle with the time at which the rising edge of signal V3 occurs (indicative of a positive-going slope voltage zero crossing), producing signal V5. Signal V5 thus comprises pulses 210, each of which occur at the positive-going zero crossing of the current on distribution line 48. Instead of referencing to the timing signal provided by current transformer 88, as is done with regard to the embodiment in FIG. 7, monitoring the phase angle between voltage and current permits reference to the voltage to determine zero crossing times for the current on the distribution line.

As further noted above, if the phase angle between voltage and current is relatively constant on distribution lines 48, an operator can set a phase angle control in differential circuit 86 to the predetermined phase angle. The phase angle setting produces a signal indicative of the constant phase angle, just like the signal produced by phase angle monitor 89. This signal is applied to the voltage zero crossing reference of signal V3 to derive a timing reference to current zero crossing that comprises signal V5.

Figure 9:
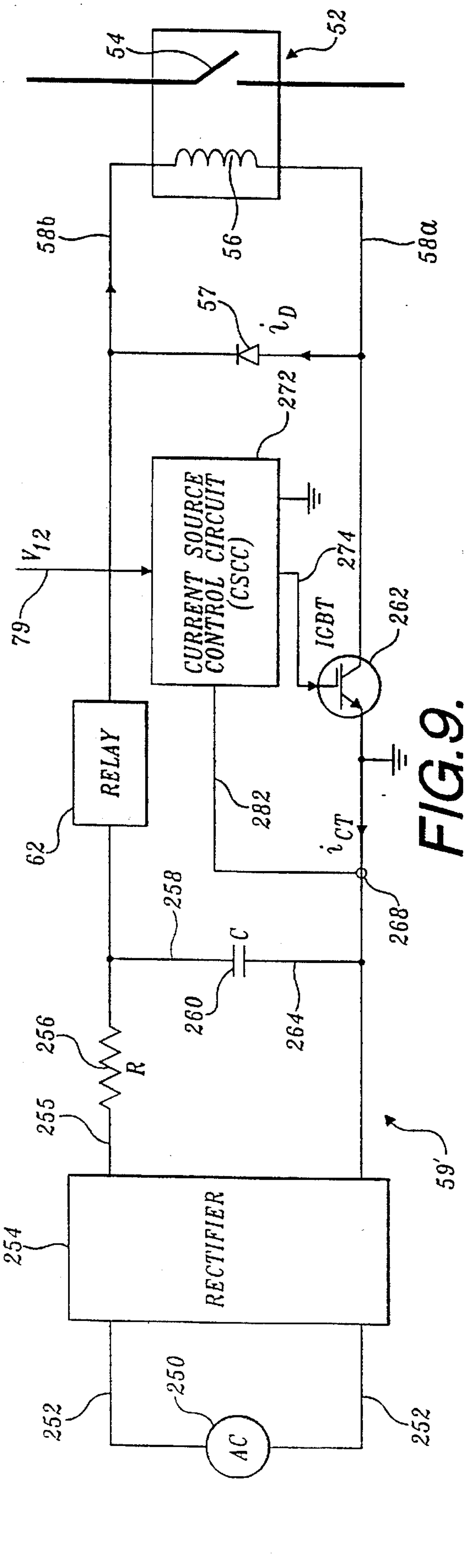
FIG. 9 is a schematic block diagram of an alternative constant current circuit for driving a circuit breaker solenoid using an AC source.

In FIGS. 4 and 7, a circuit breaker activation circuit 59 is illustrated (within the dash lines at the bottom of the figures). FIG. 9 shows an alternative activation circuit indicated generally by reference numeral 59' that can be used in either embodiment of the adaptive sequential controller. The activation circuit shown in FIG. 9 omits DC source 60, replacing it with an AC source 250, which is connected by lines 252 to a full wave rectifier 254. Unlike DC source 60, which typically comprises a battery bank having a relatively stable voltage, AC source 250 is subject to line variations that may cause changes in the response time of circuit breaker 52, which are not readily compensated, because they tend to vary unpredictably. Accordingly, activation circuit 59' regulates the current flow supplied solenoid 56 of circuit breaker 52, thereby compensating for variations in the voltage level of AC source 250. Activation circuit 59' also includes a diode 57 that is connected in parallel with solenoid 56, the cathode of the diode being coupled to relay 62 via lead 58*b*.

A line 255 connects the output of full wave rectifier 254 to one end of a resistor 256, the other end of which is connected to the collector of an insulated gate bipolar transistor (IGBT) 262 by a lead 258. Lead 258 also connects to a capacitor 260, the opposite end of which is connected to the other output of rectifier 254 through a lead 264. The emitter of IGBT 262 is connected through a lead 266 to relay 62, and its base is connected through a line 274 to a current source control circuit (CSCC) 272. CSCC 272 receives a signal indicative of the current flow through solenoid 56 of circuit breaker 52 that is conveyed from a current sensing circuit 268 through a line 282. In addition, CSCC 272 is coupled to line 79 to receive signal V12, which is supplied to control activation of circuit breaker 52. In connection with IGBT 262, CSCC 272 thus regulates the current flow through solenoid 56 when signal V12 conveys pulse 220, causing the CSCC to bias the base of IGBT 262 so that the device conducts current. Regulated current flows through the relay contacts in relay 62, through solenoid 56, and returns through line 264 to full wave rectifier 254. When IGBT 262 is turned on, the current flowing through lead 266, $i_{CT}$, equals the current through solenoid 56, $i_{CB}$, and the current through diode 57, $i_D$, is zero. When IGBT 262 is turned off, $i_{CT}$ is zero, and $I_{CB}$ equals $i_D$.

Figure 10:
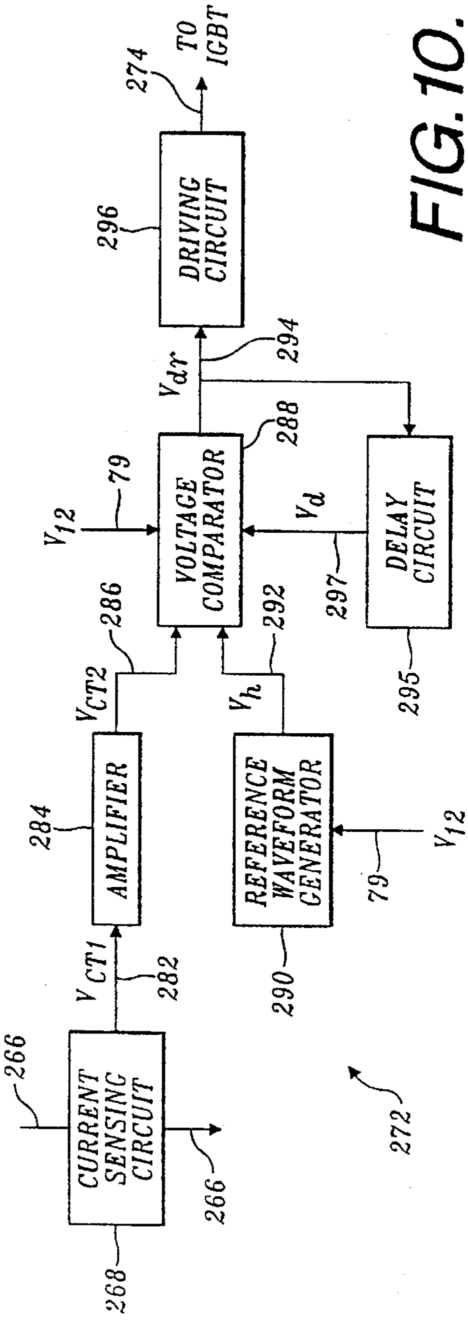
FIG. 10 is a schematic block diagram of a feedback circuit to control and regulate the current supplied to activate a circuit breaker solenoid.
Figure 11:
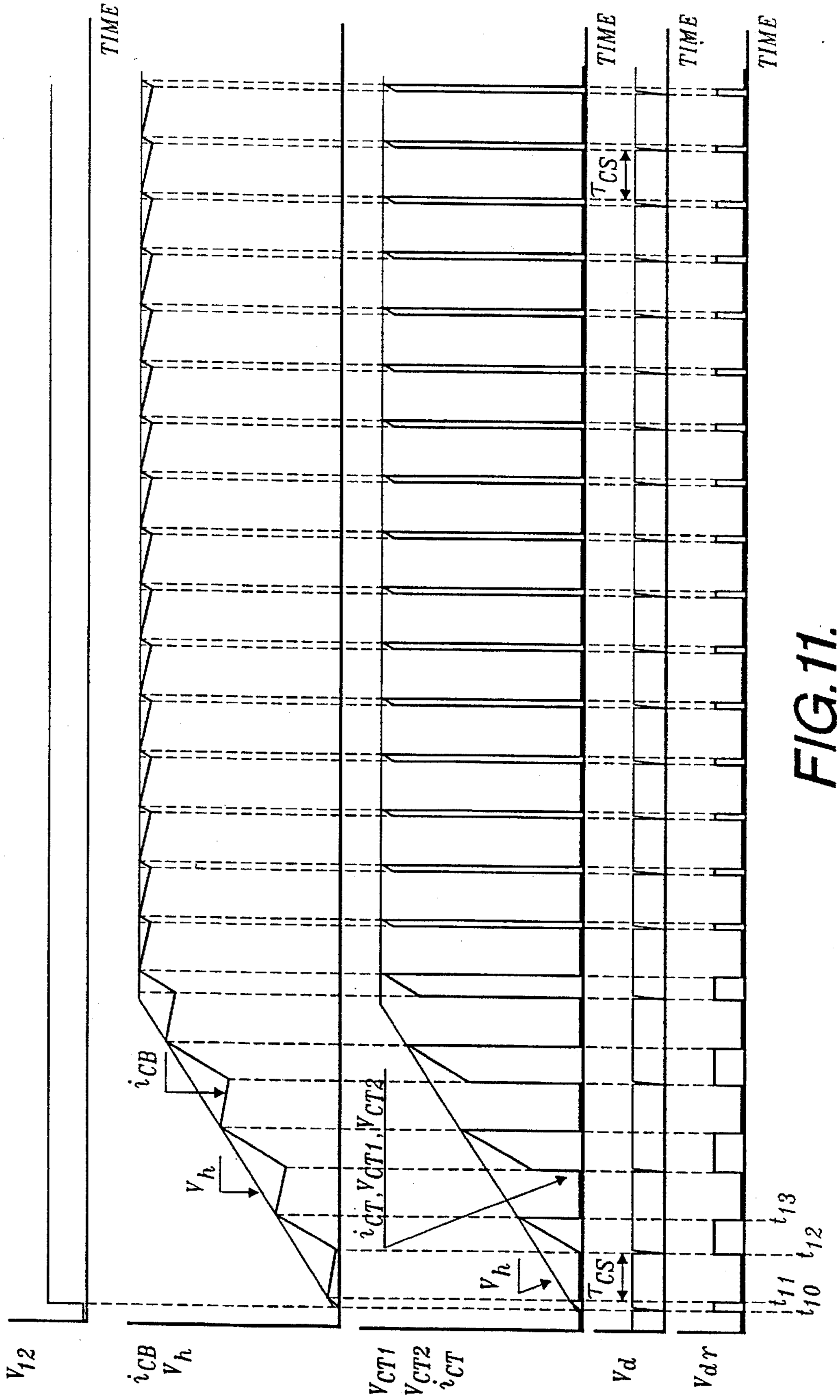
FIG. 11 is a graph showing several waveforms over time of signals used in regulating the current that activates a circuit breaker solenoid.

Details of CSCC 272 are shown in FIGS. 10 and 11. Current sensing circuit 268 produces an output voltage ($V_{CT1}$) proportional to the current ($i_{CT}$) of IGBT 262 that is input to an amplifier 284 over a line 282. Amplifier 284 increases the amplitude of the signal $V_{CT1}$ by a fixed gain, producing an output signal ($V_{CT2}$) that is conveyed on a line 286 to a voltage comparator 288. The other input of voltage comparator 288 is connected through a line 292 to a reference waveform generator 290 that produces a reference voltage waveform ($V_h$) when enabled by signal V12. When signal V12 is high, voltage comparator 288 compares the signal indicative of current flow through IGBT 262 to the desired reference voltage source level $V_h$, and receives a pulse signal, $V_d$, from a delay circuit 295 through a lead 297, producing an output signal $V_{dr}$ that is conveyed by a line 294 to a driving circuit 296. The output of driving circuit 296 is supplied to the base of IGBT 262 to control the conductivity of the device, and thus to regulate the current flow through solenoid 56.

When the rising edge of signal V12 occurs at a time $t_{10}$, reference waveform generator 290 produces a reference voltage $V_h$, and voltage comparator 288 sets its output $V_{dr}$ to a high level. The voltage across storage capacitor 260 is applied to the two ends of solenoid 56 through the conduction of both IGBT 262 and relay 62. The current through solenoid 56 ($i_{CB}$) increases, as also does $V_{CT1}$ and $V_{CT2}$. When IGBT 262 is on, its current $i_{CT}$ is equal to the current $i_{CB}$through the solenoid. At a time $t_{11}$, $V_{CT2}$ is equal to $V_h$, and voltage comparator 288 sets it output $V_{dr}$ to a low level, which turns IGBT 262 off. The current $i_{CT}$ through the IGBT becomes zero, and so do $V_{CT1}$ and $V_{CT2}$. The solenoid current $i_{CB}$ flows through freewheeling diode 57 and decays. The falling edge of $V_{dr}$ also enables delay circuit 295. After a fixed time ($\tau_{cs}$), at a time $t_{12}$, the delay circuit generates a pulse $V_d$, which makes voltage comparator 288 set its output voltage $V_{dr}$ to a high level. A new period begins. The current flowing through solenoid 56 is thus substantially regulated to a fixed level waveform as shown in FIG. 11.

Figure 12:
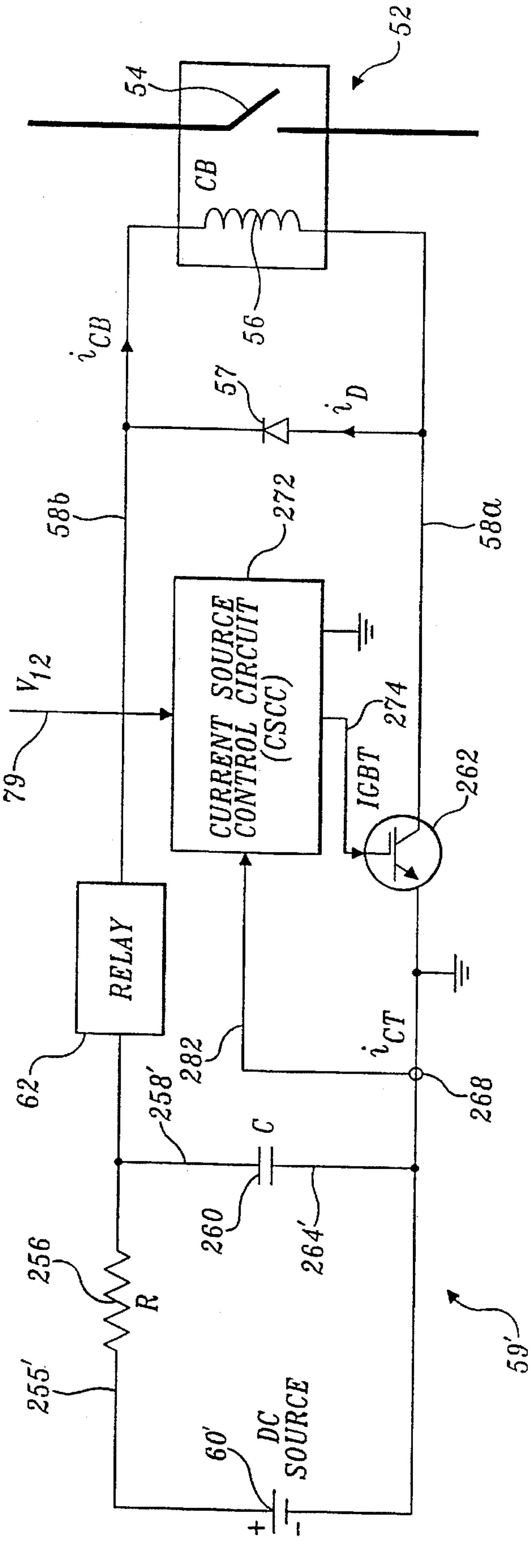
FIG. 12 is a schematic block diagram of another embodiment for a DC constant current circuit used to control and drive the circuit breaker solenoid.

In FIG. 12, a still further embodiment of the activation circuit is generally indicated by reference number 59". In this embodiment, a DC source 60' is used that is somewhat less stable than DC source 60 in corresponding circuit 59 and therefore, requires regulation to ensure that the current does not fluctuate, causing variations in the response time of circuit breaker 52. DC source 60' is connected on the positive side through a line 255' to resistor 256 and on the negative side through a line 264' to capacitor 260 and solenoid 56. All other components of the embodiment shown in FIG. 12 are identical to solenoid control circuit 59', which was discussed above with respect to FIG. 10. CSCC 272 monitors the current flowing through solenoid 56 to develop a positive feedback signal that is used to control the current flow, thereby regulating it to a relatively constant level.

By compensating for changes in the response time of circuit breaker 52 resulting from aging and for changes resulting from the effects of temperature, barometric pressure, and humidity, adaptive sequential controllers 50/50' provide a significant improvement over prior art devices used to control circuit breakers and other types of switches. For application of the device where the phase angle of the distribution line is relatively constant, it is possible to use potential transformer 70 to provide the timing and reference signals and for detecting transients, eliminating the need for current transformer 88, thereby substantially reducing the cost of a sequential adaptive controller used in controlling both opening and closing of circuit breaker 52. Even in those situations where the power factor changes because of varying loads applied to distribution line 48, phase angle monitor 89 can be used to determine the phase angle between current and voltage on distribution line 48, thereby enabling the timing and reference signal developed in response to the voltage to be used in controlling the opening of the circuit breaker by deriving the current zero crossing reference as a function of the phase angle.

Another embodiment of the adaptive sequential controller has been developed that has several advantages over the preferred embodiments disclosed above. This embodiment of the circuit breaker can selectively be set to close the circuit breaker at a peak voltage on the line, to minimize inrush current to a transformer or other highly inductive load, or to dose on a zero voltage crossing of the voltage waveform, to minimize transients that might damage equipment connected to the line. Perhaps the most important advantage of this embodiment is that it insures a circuit breaker adaptively opens (and in some cases closes) with a minimum "switching energy." The term "switching energy" is defined in greater detail below.

Figure 13A:
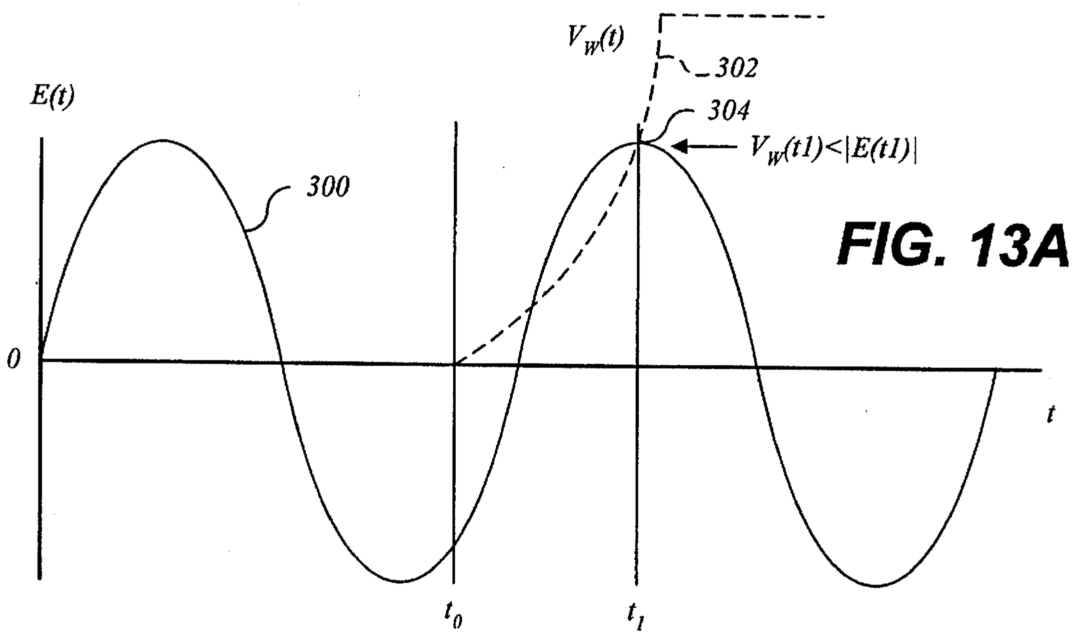
FIGS. 13A through 13C graphically show the line voltage and current waveforms in relationship to a minimum switching energy developed as a circuit breaker opens.
Figure 13B:
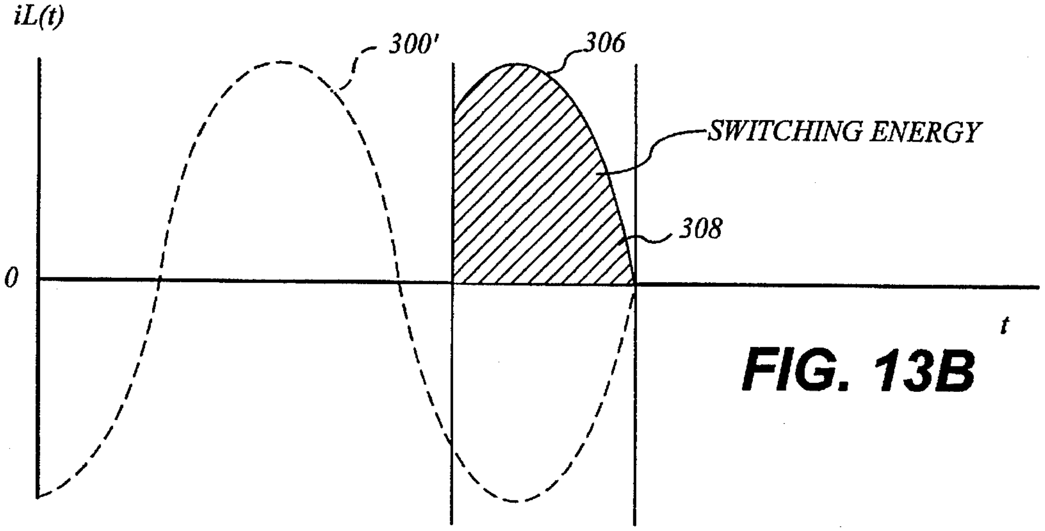
Figure 13C:
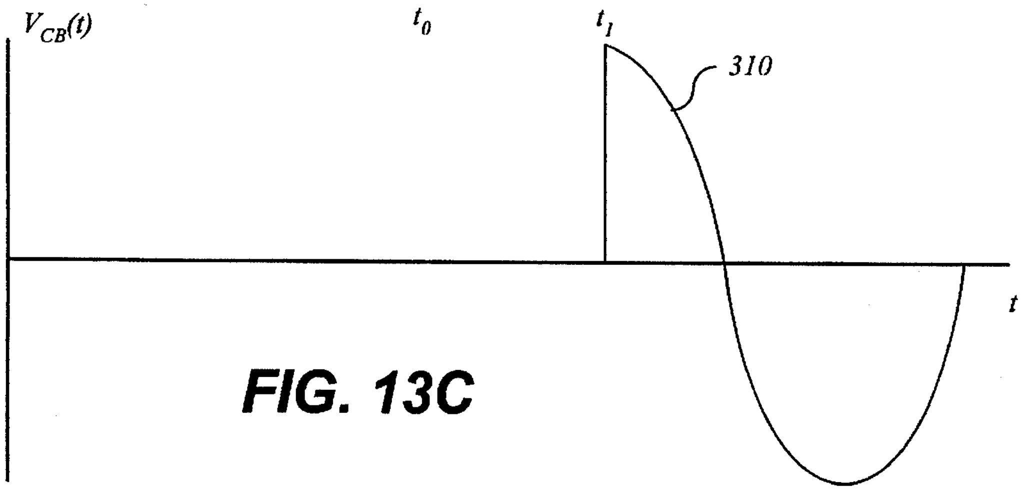

For a purely resistive load and assuming that the circuit breaker contacts operate sufficiently fast, opening the circuit breaker to interrupt current to the load at a zero current crossing time will insure that minimum switching energy is developed in the circuit breaker. But if the circuit breaker is too slow in response, it will be necessary to open the contacts of the circuit breaker either before or after the zero current crossing, to achieve the minimum switching energy. Similarly, if the load controlled by the circuit breaker is substantially inductive (or capacitive), the contacts of the circuit breaker should also be opened at other than the zero current crossing to minimize the switching energy. As shown in FIGS. 13A through 13C, a substantially minimum switching energy in the circuit breaker interrupting an inductive (or capacitive load) will only be achieved if a withstand voltage of the circuit breaker contacts, $V_W(t)$, is always greater than a recovery voltage, $V_{CB}(t)$, as the circuit breaker opens. In contrast, in FIGS. 14A through 14C, a substantially greater switching energy is expended in the circuit breaker because as the circuit breaker opens, $V_{CB}(t)$ exceeds $V_W(t)$ at a time $t_x$.

Referring first to FIGS. 13A through 13C, the two contacts of the circuit breaker begin to separate at a time $t_0$. As the breaker contacts separate, an arc strikes between the contacts creating an arc plasma that possesses considerable energy. The magnitude of the switching energy, $E_{switching}$, consumed in the breaker as it opens is defined by the following equation:

$$E_{switching} = \int_{t_0}^{t_1} i(t)*v(t)dt \quad (1)$$

where $t_0$ is the initial time that the breaker contacts begin to separate, $t_1$ is the time when the arc between the contacts is finally extinguished, i(t) is the current through the circuit breaker, and v(t) is the voltage between the contacts of the circuit breaker. For a vacuum circuit breaker, when an arc occurs between the contacts, v(t) is a constant value; for all other types of circuit breakers, v(t) is a function of the current through the circuit breaker (and through the load), i(t). For nonvacuum-type circuit breakers, the relationship between v(t) and i(t) is relatively difficult to determine. In FIGS. 13B and 14B, the switching energy shown in a shaded area 308 is that which would be developed in a vacuum circuit breaker.

As shown in FIG. 13B, an arc current 300' is equal to the load current, iL(t), before the contacts open, and equal to the arc current thereafter. As the distance between the contacts of the breaker increases, the withstand voltage $V_W(t)$ also increases as shown by dash line 302 in FIG. 13A. In this Figure, a line 300 represents the time varying value of line voltage, E(t). The line voltage attains its periodic maximum value at time $t_1$, when the current through the breaker contacts is crossing zero. At this instant, the line voltage is equal to the circuit breaker recovery voltage, $V_{CB}(t)$, as indicated by a line 310 in FIG. 13C. The total switching energy developed by the circuit breaker corresponds to the area under a curve 306, as represented by shaded area 308 in FIG. 13B. Note that at time $t_1$, the arc is extinguished and does not restrike because $V_W(t)$ remains greater than the recovery voltage $V_{CB}(t)$.

Figure 14A:
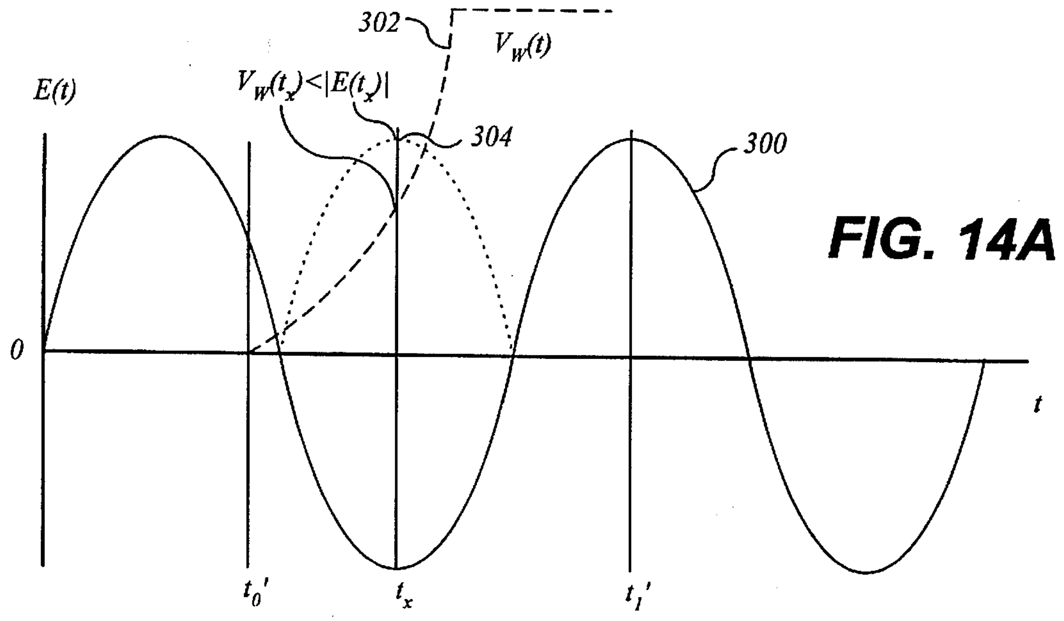
FIGS. 14A through 14C, in contrast to FIGS. 13A through 13C, graphically show the line voltage and current waveforms in relationship to a substantially greater switching energy that can be developed when the circuit breaker opens.
Figure 14B:
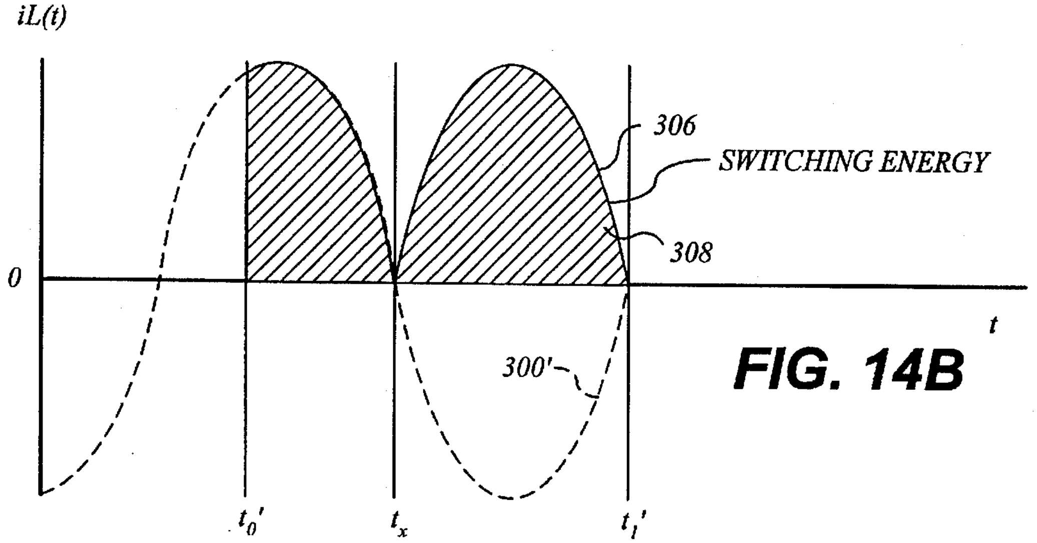
Figure 14C:
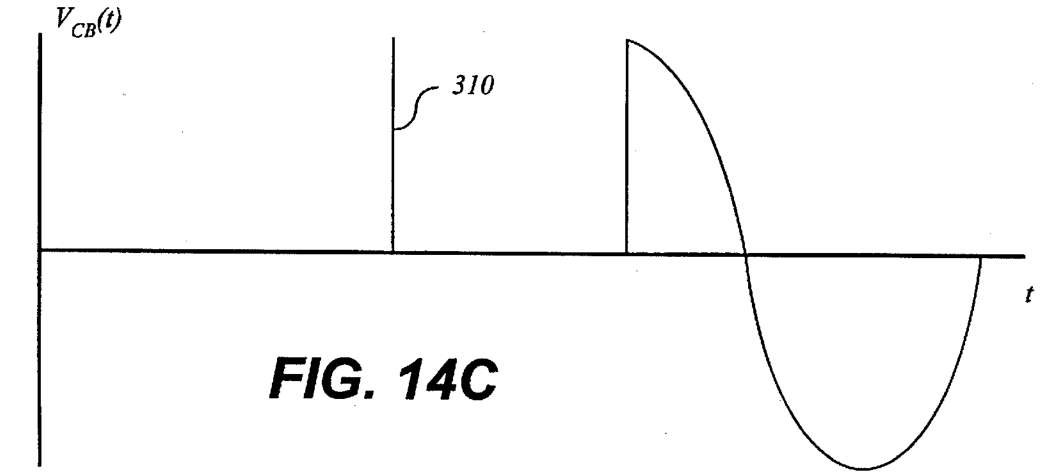

Referring now to FIGS. 14A through 14C, a substantially greater switching energy in shaded area 308 is developed in the circuit breaker because the contacts of the circuit breaker begin opening at a different time $t'_0$. In this case, when the arc current passes through zero at time $t_x$, the withstand voltage between the contacts of the breaker, $V_W(t)$, is less than the magnitude of the line voltage, which equals the circuit breaker recovery voltage, $V_{CB}(t)$, at that time. As a consequence, a restrike of the arc between the breaker contacts occurs immediately after time $t_x$ and the arc is not extinguished until a subsequent zero current crossing at time $t_1'$.

When a circuit breaker closes, virtually no switching energy or transient are produced if closure of the contacts occurs when the line voltage is crossing zero. Accordingly, controlling a circuit breaker so that it closes at a zero crossing point for the line voltage both minimizes transients (thereby avoiding damage to other equipment in the system) and switching energy.

In contrast, when a circuit breaker opens, the current through the breaker, i(t), depends upon the load. The product, i(t)*v(t), in the above equation that is integrated over time to determine switching energy also thus depends upon the load. To minimize switching energy, it is necessary to minimize the time interval over which this product is integrated. Thus, the initiation of circuit breaker contact separation (to in FIGS. 13A through 13C) should be chosen to occur as late as possible after a zero current crossing, so long as no restrike of an arc occurs after the current next passes through zero, as a result of the voltage across the contacts exceeding their withstand value at the next zero current crossing time. To achieve this result, it is necessary to know the exact current-zero instance, and both the recovery voltage curve and the withstand voltage curve for the circuit breaker. The current-zero instance, i.e., the time when the load current passes through zero, is readily determined by directly monitoring the current, or by monitoring the voltage zero crossing if the load power factor is known (or measured). Because a steady state current is periodic, the current-zero instance can be easily anticipated from a determination in a preceding cycle, unless a short circuit occurs. The recovery voltage curve of a circuit breaker strongly depends upon the load and stray parameters such as the length of the line connected to the circuit breaker, the layout of the line, and stray capacitance and inductance of the circuit breaker and connected circuits. These parameters can be obtained either through simulation and calculation, or by testing each circuit breaker installation. The withstand voltage curve for the circuit breaker (the dielectric strength characteristics of its contacts) can also be obtained by empirical testing or from manufacturer's specifications.

If the interrupting current is less than the rated current, testing of the circuit breaker to obtain the withstand voltage curve is relatively simple, because the characteristic is not current dependent. Determining the withstand voltage curves during short circuits is much more difficult. Opening a circuit breaker during a fault requires that it withstand a relatively large switching energy. Clearly, the stress on a circuit breaker can be greatly reduced by switching it so as to achieve a minimum switching energy, using the adaptive sequential controller to determine the appropriate time to initiate the opening command to compensate for the inherent response time of the circuit breaker and changes in the circuit breaker that can occur due to aging and environmental effects.

During a fault, a circuit breaker carries out two functions. Most importantly, the circuit breaker interrupts the short circuit or fault current. Then, after successfully interrupting the fault current, the circuit breaker recloses. The reclosure tests to determine if the fault was temporary, such as a high wind causing a cross phasing short circuit of the overhead lines, or of a more permanent nature. To interrupt the fault current, the time at which the circuit breaker contacts begin to separate should be chosen to minimize switching energy. For reclosing, the closing time for the circuit breaker should be selected to achieve either a minimum switching energy or minimum switching transients, as discussed above. Adaptive control of a circuit breaker so as to insure that it opens with minimum switching energy is achieved in a manner analogous to the control of the circuit breaker to insure that it closes with minimum transients. Specifically, the response time of the circuit breaker to an open command must be determined, along with the appropriate time $t_0$ at which the contacts of the circuit breaker should begin opening. The adaptive sequential controller, upon receiving an external command to open the circuit breaker, references the time at which the open command should be applied to the circuit breaker to either a voltage (or current zero crossing time—if the load power factor is known or measured). The response time of the circuit breaker to the open command that was last determined is added to the time at which the contacts of the breaker should begin opening to determine when the open command is applied to the circuit breaker. Since the response time of the circuit breaker, which can vary as a result of aging and as a consequence of ambient environmental conditions, is adaptively determined each time that the circuit breaker is actuated, the next time the circuit breaker must be opened, the signal to open the breaker is applied to it at an appropriate time in advance of the time $t_0$ to properly compensate for any changes in the delay of the circuit breaker.

Figure 15A:
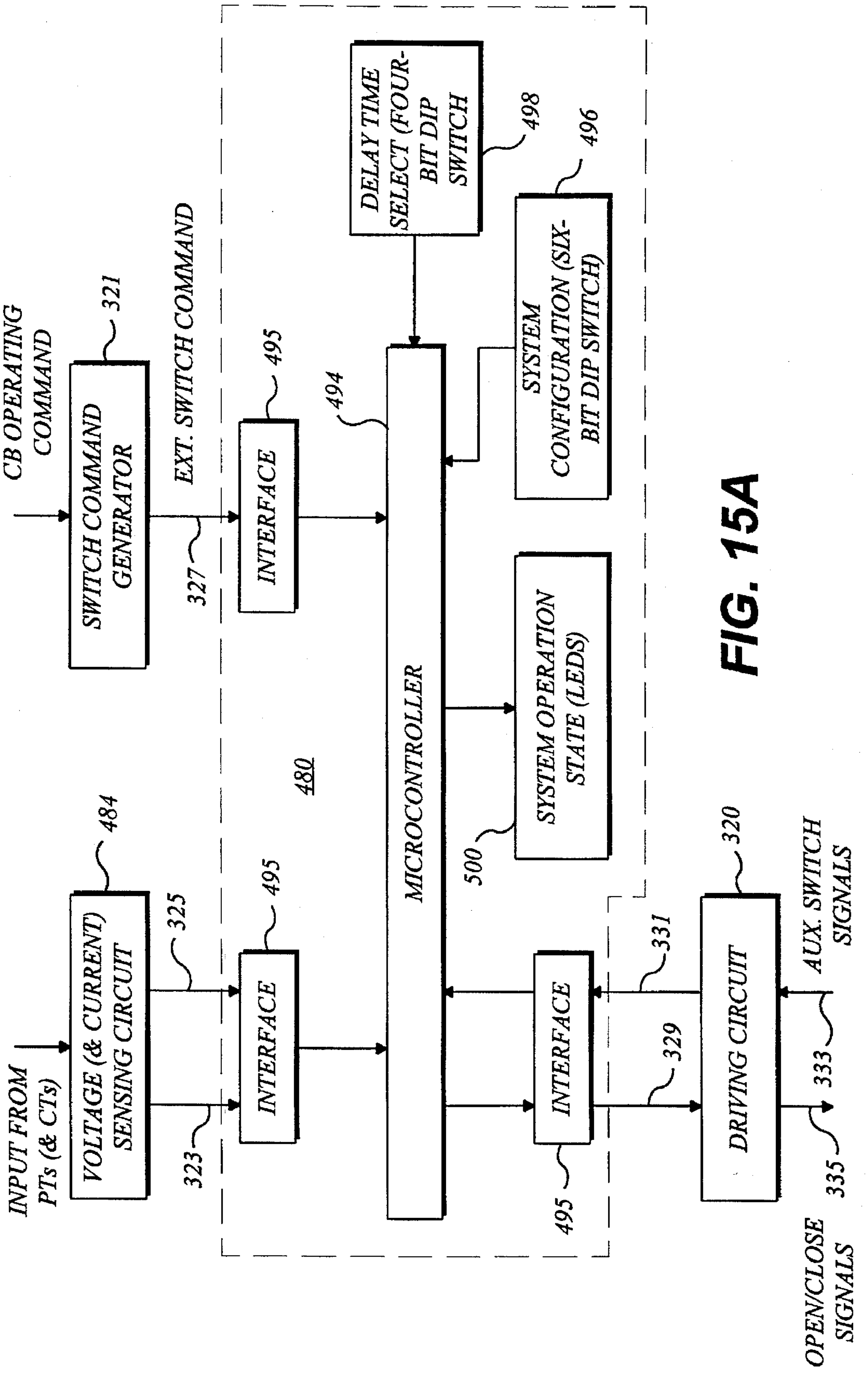
FIG. 15A is a block diagram showing a preferred embodiment of the adaptive sequential controller that senses the operation of the circuit breaker using an auxiliary switch in the circuit breaker and which controls the circuit breaker so as to minimize switching energy, at least upon opening the circuit breaker.
Figure 19:
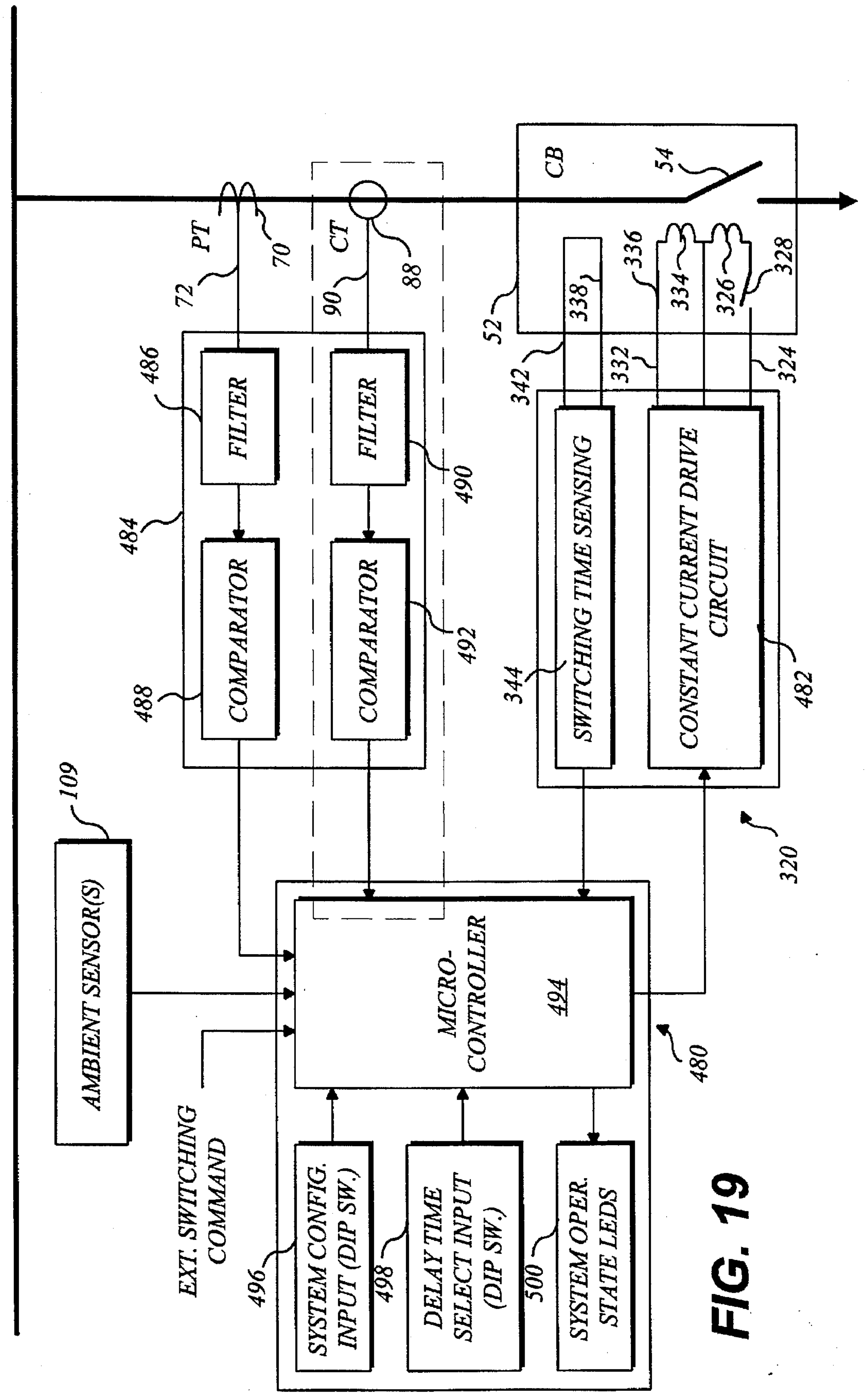
FIG. 19 is a more detailed block diagram of the microcontroller-based adaptive sequential controller of FIG. 15A and related components.

An adaptive sequential controller 480 is shown in FIG. 15A. FIG. 19 shows how adaptive sequential controller 480 controls circuit breaker 52 so as to minimize switching energy when the circuit breaker opens and so as to minimize transients when the circuit breaker closes. Unlike the preceding preferred embodiments of the present invention disclosed above, adaptive sequential controller 480 does not sense transients developed on the distribution line to determine an adaptive time interval, $\tau_{adp}$, which should be applied to the control of the circuit breaker the next time it is opened or closed. Instead, adaptive sequential controller 480 uses an auxiliary switch 338 in circuit breaker 52 to sense the response time of the circuit breaker to either an opening command or a closing command. However, it should be apparent that instead of using auxiliary switch 338 to determine changes in the response time of the circuit breaker, any transients produced on the distribution line when the circuit breaker opens or closes can be sensed, as discussed above in connection with adaptive sequential controllers 50 and 50'.

Figure 15B:
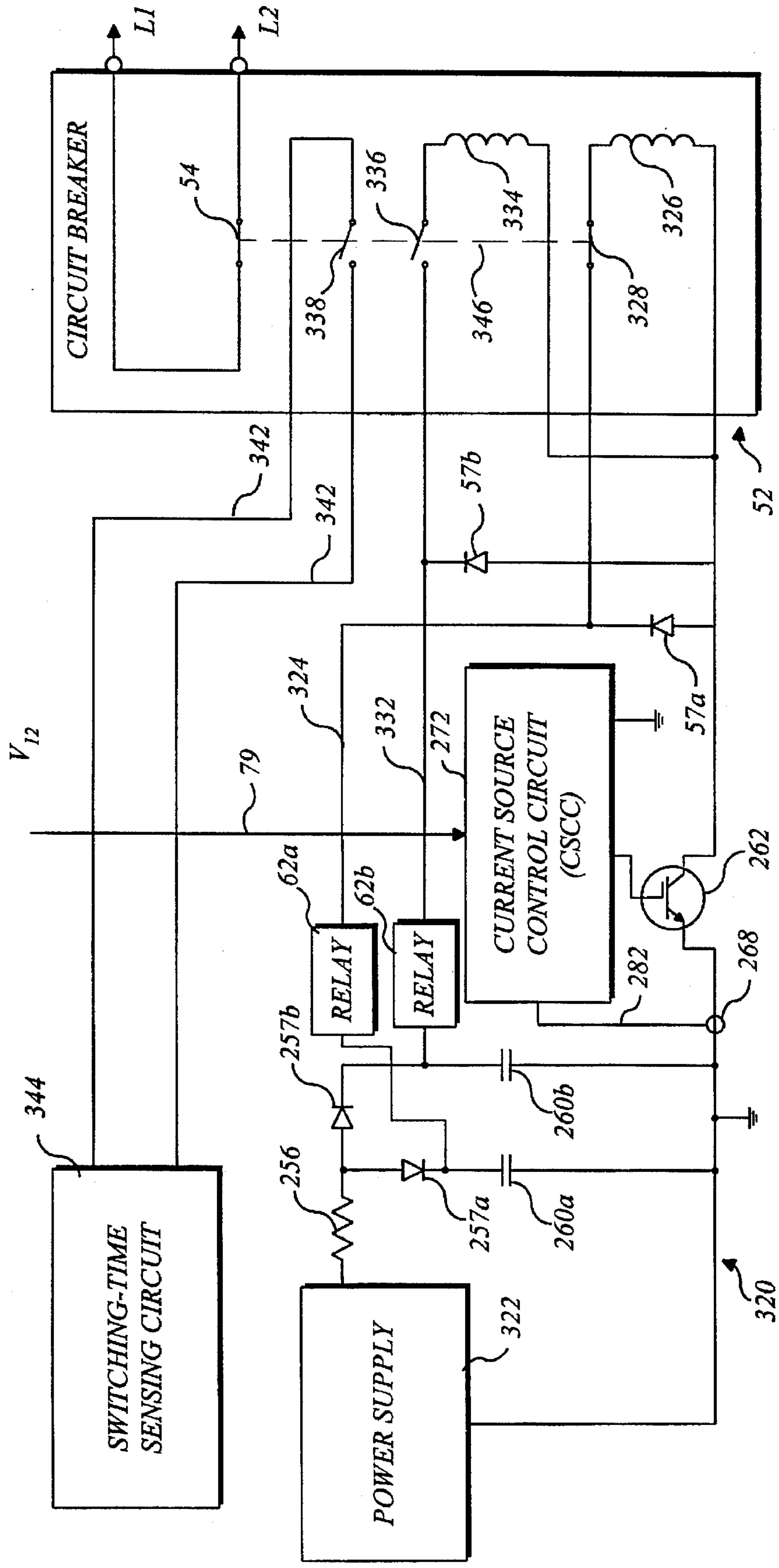
FIG. 15B is a block diagram that shows the constant current circuit for driving separate circuit breaker opening and closing solenoids used in connection with the embodiment of FIG. 15A, and a switching-time sensing circuit for monitoring an auxiliary switch in the circuit breaker.

Referring now to FIGS. 15B and 19, details of a driving circuit 320, which is used in connection with adaptive sequential controller 480 for sensing the response time of circuit breaker 52 to signals applied to an opening coil 326 and to a closing coil 334 are shown. Primary switch 54 within circuit breaker 52 controls the flow of current between terminals L1 and L2, which are connected to the distribution line. Primary switch 54 is mechanically coupled through a link 346 to three other switches, including a closing switch 336, an opening switch 328, and auxiliary switch 338. Auxiliary switch 338 is typically provided in circuit breaker 52 for other purposes, but is used in the present embodiment as means for sensing the response times of the circuit breaker to an open command and to a close command. Primary switch 54 is closed when a close signal is provided to closing coil 334 through closing switch 336. As the primary switch closes, both auxiliary switch 338 and closing switch 326 open, as shown in FIG. 15B. Likewise, primary switch 54 opens when an opening signal is provided to opening coil 326 through opening switch 328. As primary switch 54 opens, opening switch 328 also moves from its closed position to an open position, and auxiliary switch 338 closes.

Referring back to FIG. 15A and as also shown in FIG. 19, it will be noted that adaptive sequential controller 480 comprises a micro controller 494 that is coupled to receive binary data from a 6-bit DIP switch 496 that is used to define the system configuration. The microcontroller comprises a microcomputer that includes a memory (not separately shown) in which is stored a program that controls operation of the microcontroller. The system configuration indicated by the setting of 6-bit DIP switch 496 identifies the type of circuit breaker being controlled, i.e., single phase, three phase, grounded Y, ungrounded Y, or delta, and also indicates whether one PT or three PTs, one CT or three CTs is installed in the system. For controlling a multi-phase circuit breaker (or three circuit breakers —one for each phase) in a balanced system in which the load power factor is known and remains relatively constant, only one PT 70 is required. If the load power factor on each of the phases is substantially identical, although subject to variation, or if the load power factor is not known, at least one CT 88 will be required for a multi-phase circuit breaker (or three circuit breakers in a multi-phase system). The voltage and current zero crossing times monitored by the microcontroller are used by it to determine the load power factor or phase angle between the voltage and current on the distribution line, as will be evident to those of ordinary skill in the art. The phasal relationship of each phase is known, so that by monitoring the zero voltage crossing times on one phase, the zero voltage crossing times of each of the other two phases is known. If the distribution system is imbalanced and/or the load power factor (phase angle between potential and current on each phase) is subject to change, three PTs and three CTs are required. The setting of 6-bit DIP switch 496 thus provides essential input data to microcontroller 494 identifying the particular configuration of the circuit breaker and system being controlled. Other techniques for providing this input data, such a discrete switches, hardwired logic, or data downloaded into memory could also be used for this purpose.

A 4-bit DIP switch 498 is also provided to set the delay time by which any close circuit breaker command signal must be delayed to provide sufficient time for a capacitive load coupled to the circuit breaker to discharge after the circuit breaker is opened. The time delay selected by the user with this 4-bit DIP switch can range between 0 and 15 minutes. The system operation state is indicated by LEDs 500. The signals that actuate LEDs 500 can be coupled to a data transmission system (not shown) to enable the state of the adaptive sequential controller to be monitored at a remote site.

To provide enhanced electrical isolation for adaptive sequential controller 480, all signals supplied to it or output from it are conveyed through optical fibers as light signals. Thus, a switch command generator 321 converts an externally provided circuit breaker operating command signal that is electrical in nature to a light signal that is conveyed through an optical fiber 327 to one of the optical interfaces 495. Each interface 495 includes a phototransistor and other circuitry to convert the light signal to a binary electrical signal that is input to microcontroller 494. Similarly, the secondary voltage from the one or more PTs (and the secondary current from any CTs that are used) are input to voltage (and current) sensing circuit 484, which converts these analog electrical signals to signals that clearly indicate the zero crossing time of the potential on the line (and current, if any CTs are used). The output of the voltage and current sensing circuit is converted to corresponding light signals that are respectively conveyed via optical fibers 323 and optical fibers 325 to another interface 495. Again, interface 495 converts the optical signals to corresponding binary signals that are input to microcontroller 494.

In FIG. 19, components included in the voltage and current sensing circuit are shown. The secondary of PT 70 is coupled through line 72 to a filter 486, which substantially reduces noise on the secondary. A comparator 488 provides an output signal that abruptly changes state when the potential crosses through zero. A filter 490 and a comparator 492 carry out related functions for the secondary current that is developed on CT 88 and input on leads 90. For a system that includes multiple PTs and CTs, additional filters and comparators are provided for each.

Ambient sensor(s) 109 are optionally coupled to microcontroller 494. Typically, at least the ambient temperature will be monitored by the microcontroller and used to compensate the response time of the circuit breaker for temperature, based upon a look-up table (stored in the memory of the microcontroller) or using an equation that relates response time to ambient temperature. The ambient barometric pressure sensor and/or the ambient relative humidity sensor discussed above can also optionally be applied in controlling the circuit breaker in a similar manner that adjusts the response time of the circuit breaker last determined, for these ambient conditions.

Driving circuit 320 is coupled to the auxiliary switches in each circuit breaker (or phase of a multi-phase circuit breaker) via lines 333 and transmits the open/close signals to the circuit breaker(s) through lines 335. The open/close signals provided by microcontroller 494 are conveyed as binary signals to interface 495 for conversion to light signals that are conveyed through optical fibers 329 to the driving circuit. Similarly, the auxiliary switch signals are converted by LEDs (not separately shown) in driving circuit 320 into light signals that are conveyed through optical fibers 331 to interface 495, for conversion back to binary signals that are input to microcontroller 494.

Driving circuit 320 differs from the driving circuits used in the previous embodiments of the adaptive sequential controller, because it controls the application of both the open and close signals for from one to three phases. Only one phase is shown in connection with circuit breaker 52 in FIG. 19, but use of the device to control additional phases in a multi-phase system is easily accomplished by providing the corresponding number of voltage and current sensing circuits 484 and driving circuits 320.

The preferred embodiment of driving circuit 320 shown in FIG. 15B includes a power supply 322, which may be either a DC source supply or an AC source supply. Components of driving circuit 320 that are identical to the previous embodiments of the driving circuits discussed above have the same reference numerals or are slightly modified to adapt to the enhanced functionality of the driving circuit. Thus, where the previous embodiments used only one relay 62, in driving circuit 320, two relays are used. A relay **62*a* is coupled to the cathode of a diode 257*a* and to a capacitor 260*a*. The anode of the diode is coupled to resistor 256, so that charge current for capacitor 260*a* flow from the power supply, through resistor 256 and diode 257*a*. The charge on capacitor 260*a* comprises the energy that is used for the open signal applied to the circuit breaker. When closed by the microcontroller, relay 62*a* conveys the open signal to open coil 326 through a line 324**.

Resistor 256 is also coupled to the anode of a diode **257*b*, the cathode of which is coupled to a capacitor 260*b* and to a relay 62*b*, so that the capacitor is charged by current flowing through the resistor and diode 257*b* from the power supply. The charge on capacitor 260*b* provides the energy for the close signal. Relay 62*b* controls the application of the close signal through a line 332 to closing coil 334 in circuit breaker 52, for the example shown in FIG. 19. Diodes 257*a* and 257*b* are used to isolate the capacitors from each to ensure that power is available to open the circuit breaker immediately after it has been and to close it immediately after it was opened. As in the previous embodiments of the driving circuit disclosed above, IGBT 262 is used in conjunction with CSCC 272 for regulating current in response to the signal produced by current sensing transformer 268. However, in driving circuit 320, IGBT 262 regulates current that is supplied (at different times) to both the open and close coils of the circuit breaker. A diode 57*a* is provided in parallel with open coil 326, and a diode 57*b* is provided in parallel with closing coil 334. Driving circuit 320** thus comprises an improvement over the previous embodiments, since only one driving circuit is required for both opening and closing the circuit breaker.

A further improvement in the driving circuit shown in FIG. 15B is the use of auxiliary switch 338 for sensing the response times of the circuit breaker to the open signal and to the close signal (which may be different from each other). It has been determined by laboratory testing that changes in the response time of primary switch 54 due to aging and environmental effects are reflected in the response time of auxiliary switch 338. Accordingly, once the differential between the open and close response times of auxiliary switch 338 and primary switch 54 are determined, those differential times, which are stored in the memory of the microcontroller, are readily used in compensating the delay time of the circuit breaker when it is opened and closed to achieve minimum switching energy and/or minimum transients. In addition, testing has shown that use of the auxiliary switch to determine the response times of a circuit breaker provides a much more reliable indication than detecting either voltage or current transients on the line.

Figure 16:
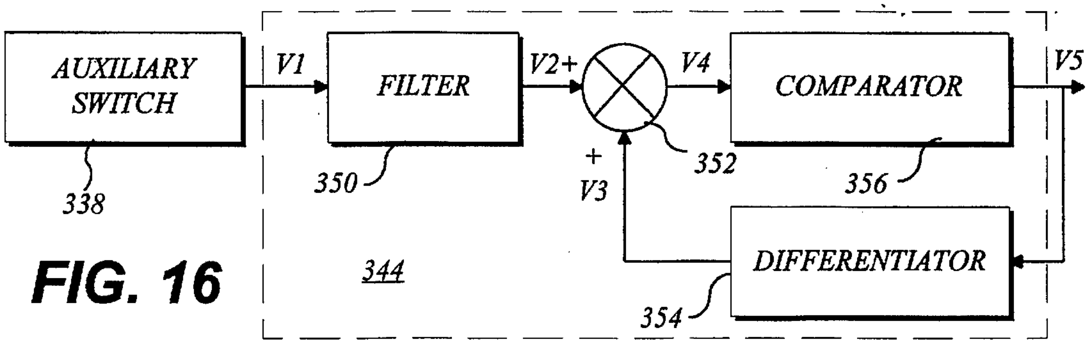
FIG. 16 is a block diagram of the switching-time sensing circuit that is coupled to an auxiliary switch in the circuit breaker.
Figure 17A:
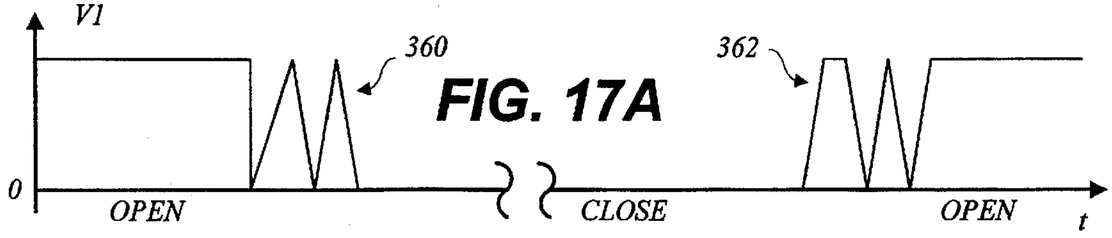
FIGS. 17A through 17E are graphs showing different signals related to the operation of the switching-time sensing circuit.
Figure 17B:
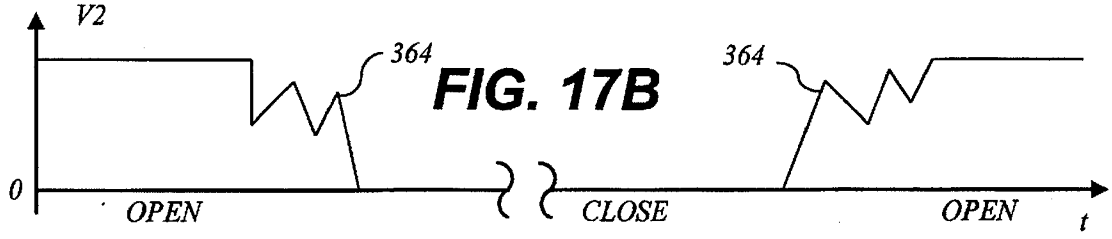

Details of switching-time sensing circuit 344 are shown in FIG. 16. FIGS. 17A through 17E also show different voltage signals developed within the switching-time sensing circuit as auxiliary switch 338 opens and closes. A voltage V1 appears across auxiliary switch 338 when it is open. As the auxiliary switch closes, noise spikes 360 are produced, as shown in FIG. 17A. Similarly, when the auxiliary switch again opens, noise spikes 362 are produced. A filter 350 is used to substantially reduce the amplitude of the noise, producing a voltage signal V2 that includes filtered noise spikes 364 of substantially reduced amplitude, compared to noise spikes 360 and 362 (see FIG. 17B).

The filtered signal V2 is combined in an adder 352, as shown in FIG. 16, with a voltage V3 that is produced by a differentiator 354. The input to differentiator 354 is an output signal V5 from a comparator 356, which receives its input as a signal V4 from the output of adder 352. The differentiator thereby provides a feedback to adder 352.

Figure 17C:
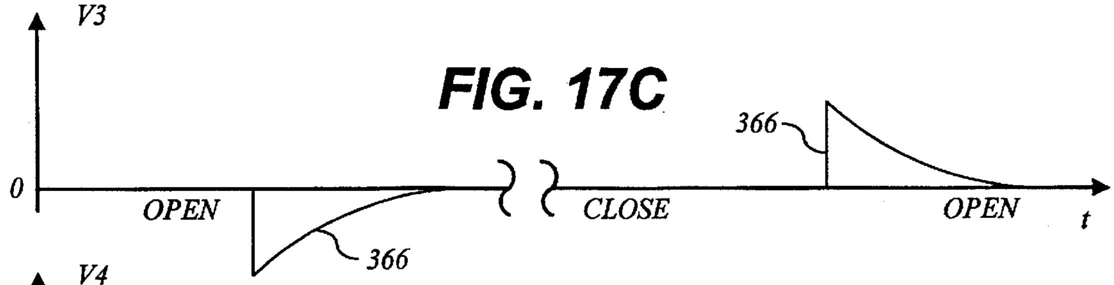
Figure 17D:
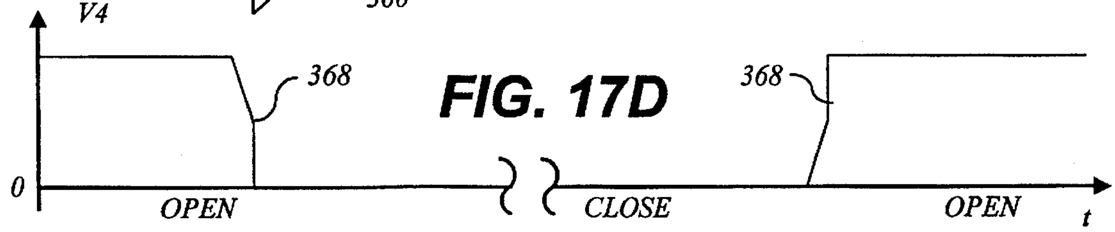
Figure 17E:
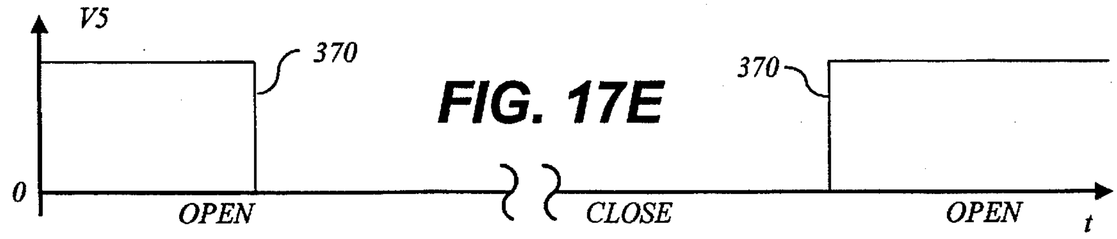

Signal V3 is shown in FIG. 17C and is an exponential waveform 366. Signal V4, which is equal to the sum of filtered signal V2 and signal V3, is shown in FIG. 17D. When auxiliary switch 338 opens and closes, signal V4, which has a waveform 368, respectively rises and falls. The output from comparator 356, signal V5, includes a waveform 370 that rapidly drops to zero when auxiliary switch 338 closes and rapidly rises to its maximum value as the auxiliary switch opens. Signal V5 thus provides an ideal indication of the times at which the auxiliary switch opens and closes in response to opening and closing signals provided to the circuit breaker, and this signal is subsequently converted by an LED (not shown) in driving circuit 320 into a light signal that is applied to adaptive sequential controller 480 through optical fibers 331 (as described above in connection with FIG. 15A) so that the response times of the circuit breaker can be determined.

Figure 18A:
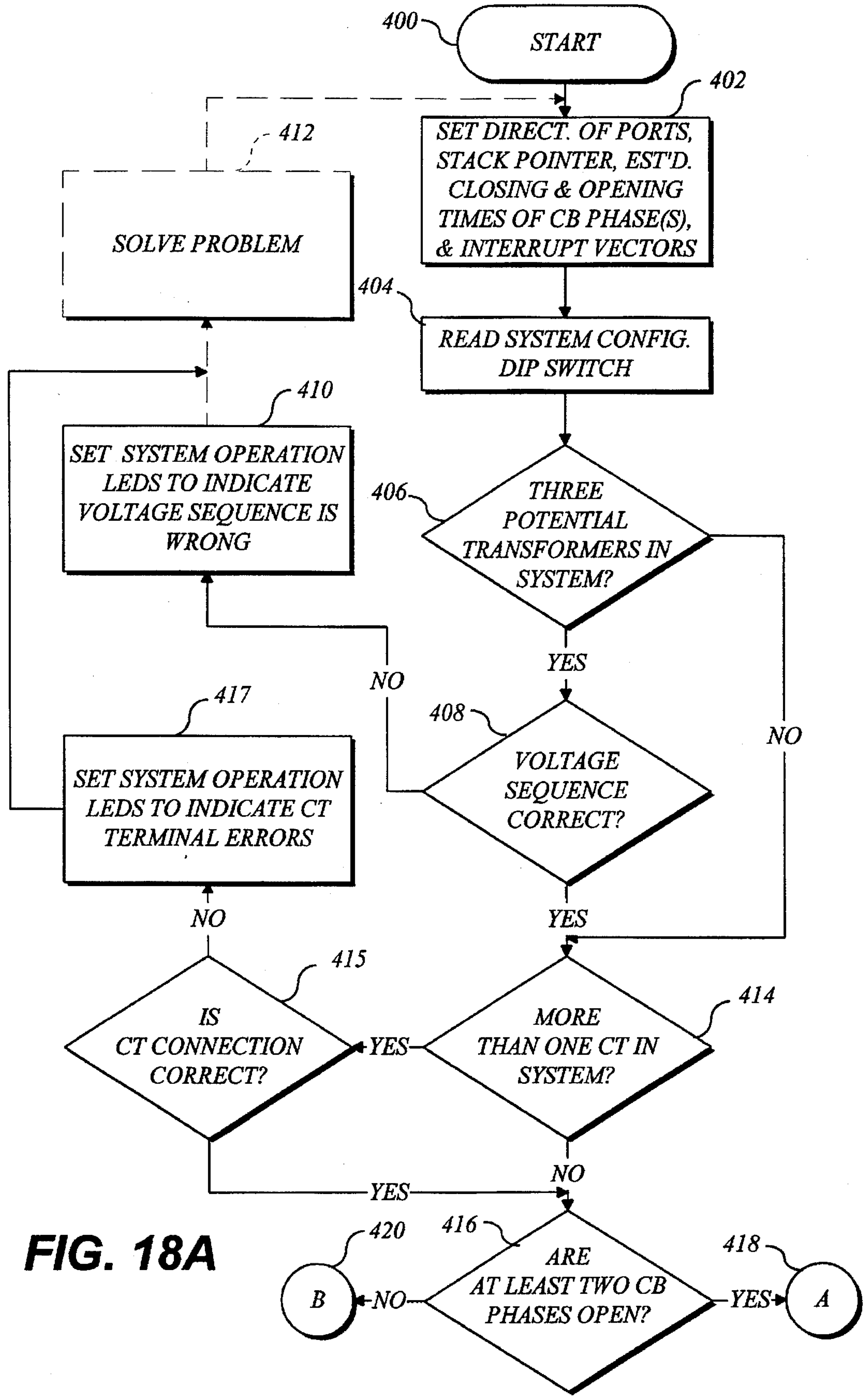
FIGS. 18A through 18E are a flow chart showing the logic implemented by a microcontroller adaptive sequential controller employed in the embodiment of FIG. 15A.

The steps carried out by microcontroller 494 in providing the opening and closing signals to one or more phases of a circuit breaker are shown in FIGS. 18A through 18E. Referring first to FIG. 18A, the logic begins at a start block 400, proceeding immediately to a block 402. Block 402 recites the initialization of various parameters used by the adaptive sequential controller. Specifically, the directions in which data move through each of the microcontroller ports is defined, i.e., ports are specified for reading or writing data. This initialization also sets the stack pointer, estimates the closing and opening times of each circuit breaker controlled based upon initial default values, sets the interrupt vectors, and generally sets up all other parameters required to control any circuit breaker(s) coupled to it. As provided in a block 404, the microcontroller then reads the system configuration DIP switch to determine the number of phases controlled, the number of PTs and CTs providing input signals to the microcontroller, and the configuration of the circuit breaker (s) that are controlled, i.e., grounded or ungrounded Y, or delta configurations. A decision block 406 employs the system configuration DIP switch data to determine whether there are three PTs in the system, and if so, a block 408 determines if the voltage sequence monitored by the three PTs is correct. In other words, decision block 408 determines if the phasing of the three PTs is correct. If not, a block 410 sets the LEDs on the system operation state indicator (and the corresponding signal at any remote sites monitored through the system operation state) to indicate that the voltage sequence is wrong. Thereafter, as indicated by the dash lines that connect to a block 412, a system operator or technician manually corrects the voltage sequence error and then restarts the system, returning to block 402.

If the response to decision block 406 is negative, or if the voltage sequence is correct in decision block 408, the logic proceeds to a decision block 414. Decision block 414 determines if there is more than one CT in the system, and if so (when the adaptive sequential controller is initially powered and assuming that current is flowing through the line), a decision block 415 determines if the current transformer phase connections are correct. If not, a block 417 sets the system operation state indicator LEDs to warn that a CT terminal wiring error has occurred. Like the corresponding error in the phasing sequence for the PTs, operator intervention is required to correct this problem, as indicated in block 412. Assuming that the CT connections are correct, the logic proceeds to a decision block 416.

Decision block 416 determines (in a multi-phase system) whether at least two of the separate circuit breakers are open. In a single phase application or for a multi-phase circuit breaker, decision block 416 would determine if the circuit breaker is open. The logic continues at a point A, in a connector block 418, if the response to decision block 416 is affirmative, and to at a point B in a connector block 420, if the response is negative.

Figure 18B:
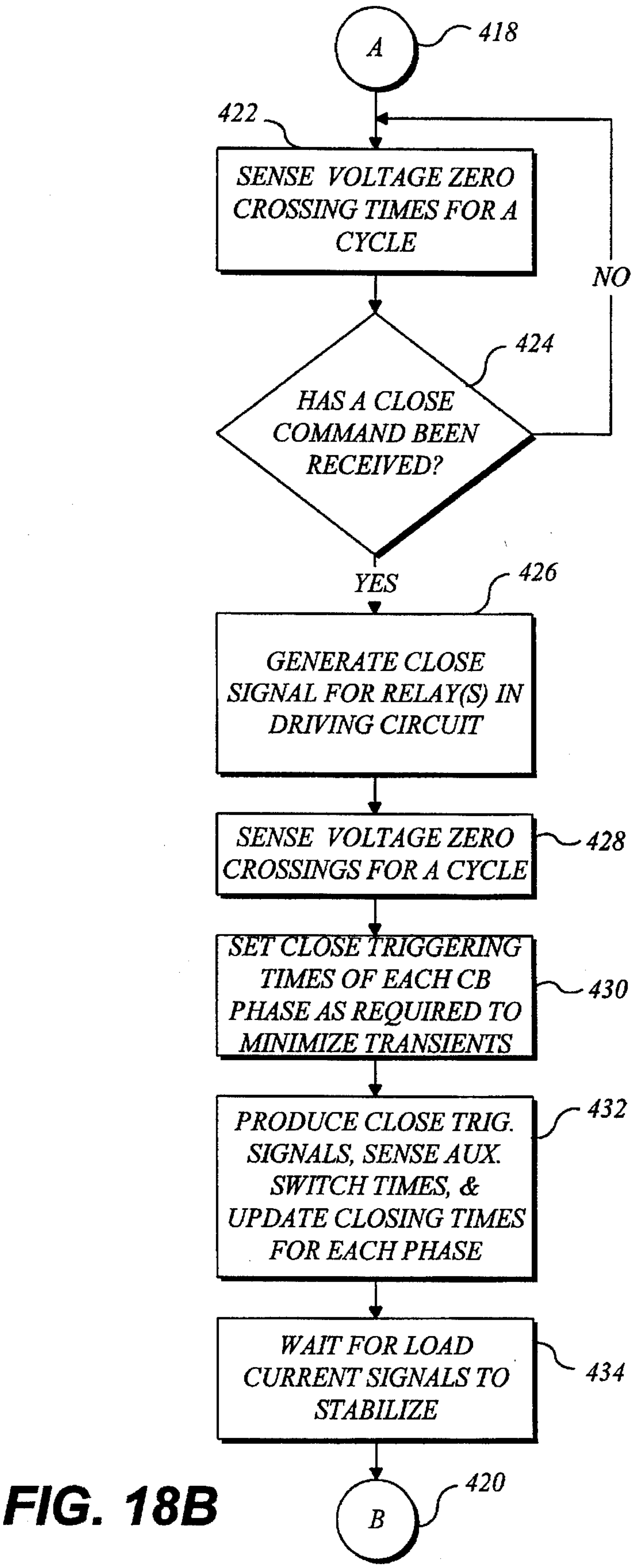

Continuing in FIG. 18B at point A, a block 422 indicates that the microcontroller senses the voltage zero crossing times during a cycle of the line current. A decision block 424 determines if a close command from an external source has been received and if not, the logic loops back to block 422 to continue sensing the zero voltage crossing times. For an imbalanced, multi-phase configuration, the zero voltage crossing times sensed in block 422 will be on each of the three phases, while in a balanced multi-phase system or for a single phase application, only one voltage zero crossing time need be sensed.

Once an externally generated close command has been received in decision block 424, the logic proceeds to a block 426, which generates a close signal for each relay 62*b* (FIG. 15B) that must be closed prior to enabling current flow to the close coils on each phase of the single or multi-phase circuit breaker that is being controlled. Thereafter, in a block 428, the microcontroller again senses the voltage zero crossing time for the current cycle to determine the reference time for each of the phases being controlled that will be used as a basis for applying the required delay to insure that the circuit breaker closes each phase at a subsequent zero voltage crossing point.

In a block 430, the close triggering times of the circuit breaker contacts are set as required to achieve a voltage zero crossing closing (or a peak voltage closing if the load is highly inductive), taking into consideration the delay of the circuit breaker in responding to the close command when last operated and any environmental parameters that affect its response time being monitored by the microcontroller. Thereafter, in a block 432, the microcontroller produces the close triggering signals for each circuit breaker phase that it controls, senses the auxiliary switch response times to the close signals, and applies the differential time between the auxiliary switch and primary switch contact response for each phase of the circuit breaker to determine the closing time delays that should be applied the next time that the circuit breaker is commanded to close. A block 434 provides for waiting for the load current signals to stabilize before any attempt is made to open the circuit breaker contacts in response to any subsequent externally generated open command. The logic then proceeds to point B, at connector block 420 in FIG. 18C.

Figure 18C:
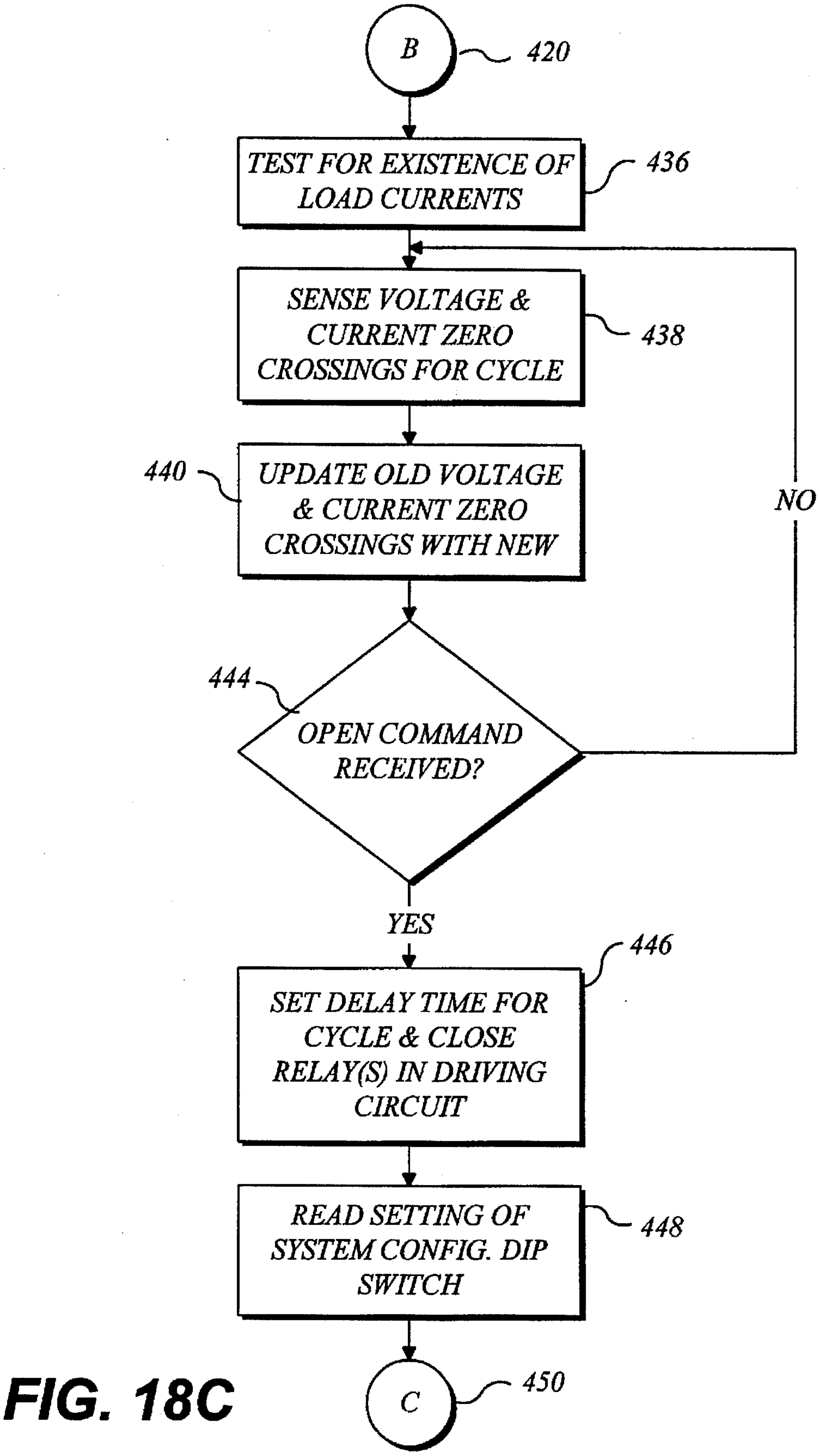

Referring to FIG. 18C, a block 436 next tests for the existence of load currents to confirm that the circuit breaker (s) is/are closed and that current is flowing through to a load. In a block 438, the microcontroller senses the voltage and current zero crossings for a one cycle. It should again be noted that in a balanced multi-phase system or a single-phase system in which the load power factor is constant and known, it is not necessary to sense the current zero crossing, since the current zero crossing can be determined from the voltage zero crossing time and the power factor. A block 440 provides for updating the old voltage and current zero crossing times (if current zero crossings are determined) with the new data obtained in the preceding block.

In a decision block 444, a check is made to determine if an open command has been received and if not, the logic repeats the monitoring of voltage (and current, as necessary) zero crossing times, and repetitively updating the old data, in a repetitive loop back to block 438 that may continue for days or even months. When an open command is finally received, the positive response to decision block 444 leads to a block 446. In block 446, the microcontroller sets a delay time necessary to allow relay(s) 62*a* to close (approximately one cycle or 13 milliseconds) and closes each relay 62*a* that is coupled in series with the open coil in the circuit breaker, for each phase of the line. (See FIG. 15B.) In a block 448, the setting of the system configuration DIP switch is read by the microcontroller to determine the specific configuration of the circuit breaker system being controlled. The logic proceeds to a point C of a connector block 450, in FIG. 18D.

Figure 18D:
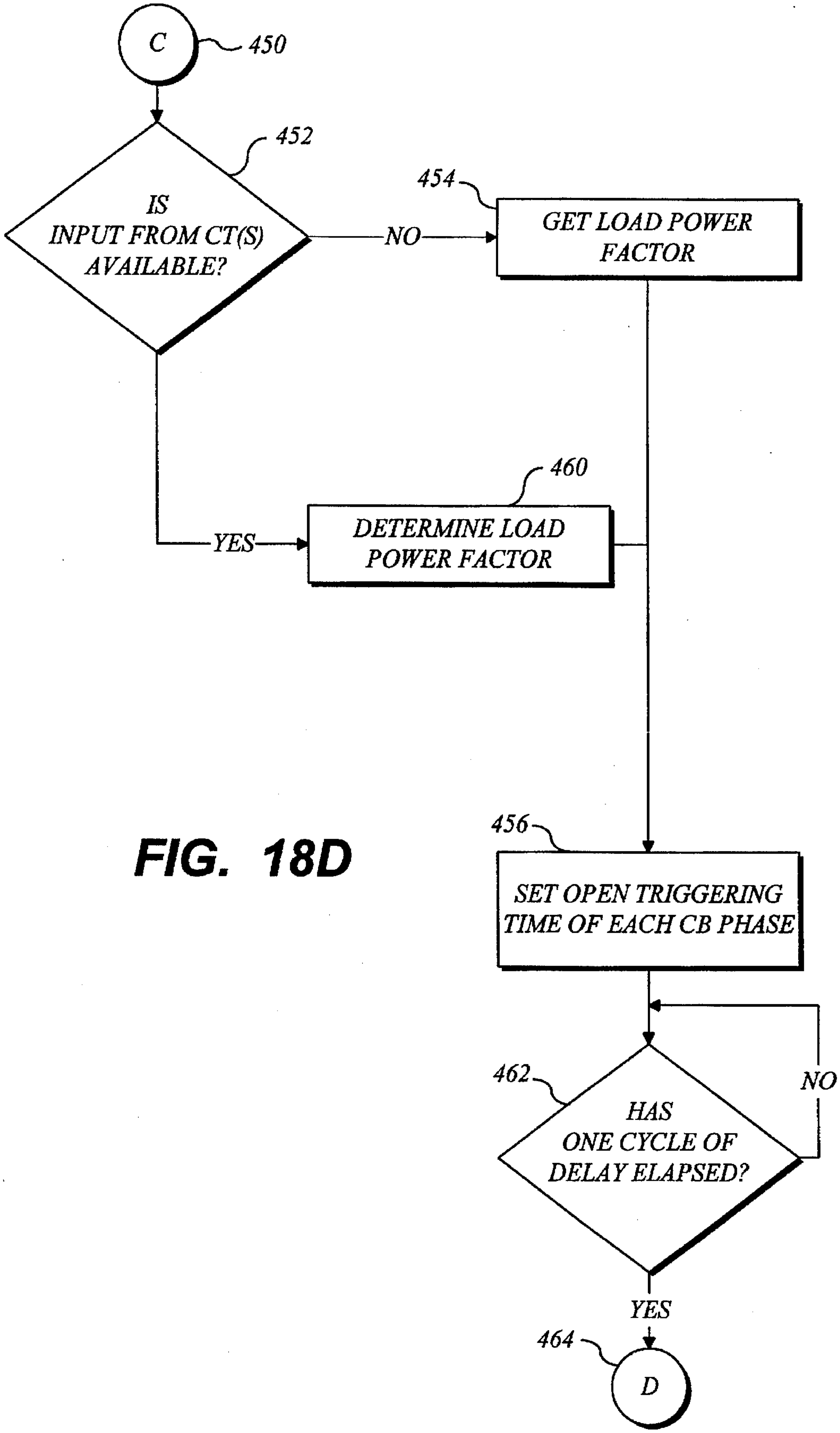

As shown in FIG. 18D, a decision block 452 determines if an input from one or more CTs is available to determine load power factor, based upon the setting of the system configuration dip switch, and if not, the microcontroller obtains the load power factor from data previously stored in its memory. The power factor data are stored in the memory of the microcontroller when adaptive sequential controller 480 is initially installed and corresponds to a known power factor for the load that is controlled by the circuit breaker. Thereafter, in a block 456, the microcontroller sets the open triggering times of each phase of the circuit breaker, as required. The open triggering time is referenced to the previously determined zero voltage crossing, and is based upon the opening response time of the circuit breaker, as determined from the auxiliary switch response time when the circuit breaker was last opened, with the required delay being included to insure that the circuit breaker opens with minimum switching energy, as discussed above. A decision block 462 determines if the one cycle of delay time previously set for closing relay(s) 62*a* has elapsed, and if not, continues to wait. Once the delay time has elapsed, the logic proceeds to a point D within a connector block 464, continuing in FIG. 18E.

Figure 18E:
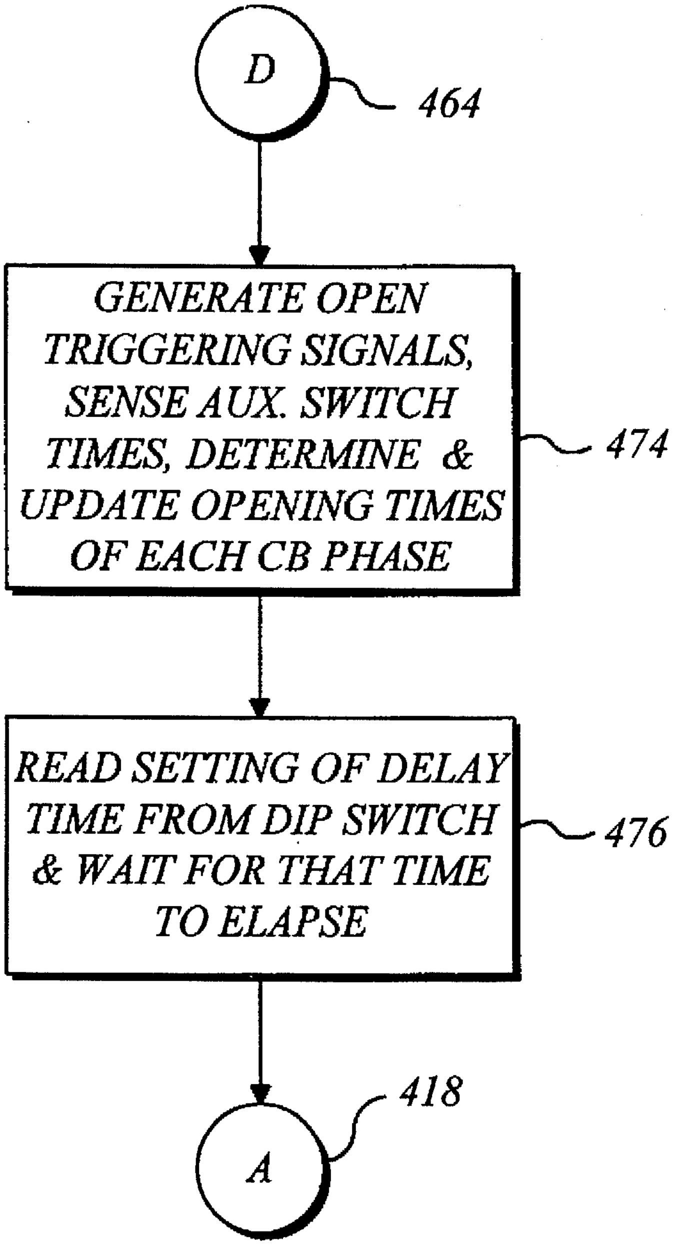

As shown in FIG. 18E, a block 474 indicates that the microcontroller generates the open triggering signals that cause each of the driving circuits to apply current to the open coils of each phase of the circuit breaker. In addition, the microcontroller senses the auxiliary switch times to determine any changes in the response time of the circuit breaker. Using these response time(s) and the differential between the auxiliary switch response and the primary switch contact response for each phase, the microcontroller determines and updates the opening times of each phase of the circuit breaker so that when the circuit breaker is again opened, the appropriate timing sequence is applied for each phase to insure minimum switching energy is expended when the breaker contacts open, as explained above. In a block 476, the microcontroller reads the delay time that was set on 4-bit dip switch 498 (FIG. 15A) and waits for that time interval before taking any further action to ensure that any capacitive load on the line has enough time to discharge. After the preset delay has expired, the logic proceeds to point A in block 418, preparing the adaptive sequential controller to wait for the next externally generated close command. This sequence of steps repeat for as long as the adaptive sequential controller is energized.

Figure 20:
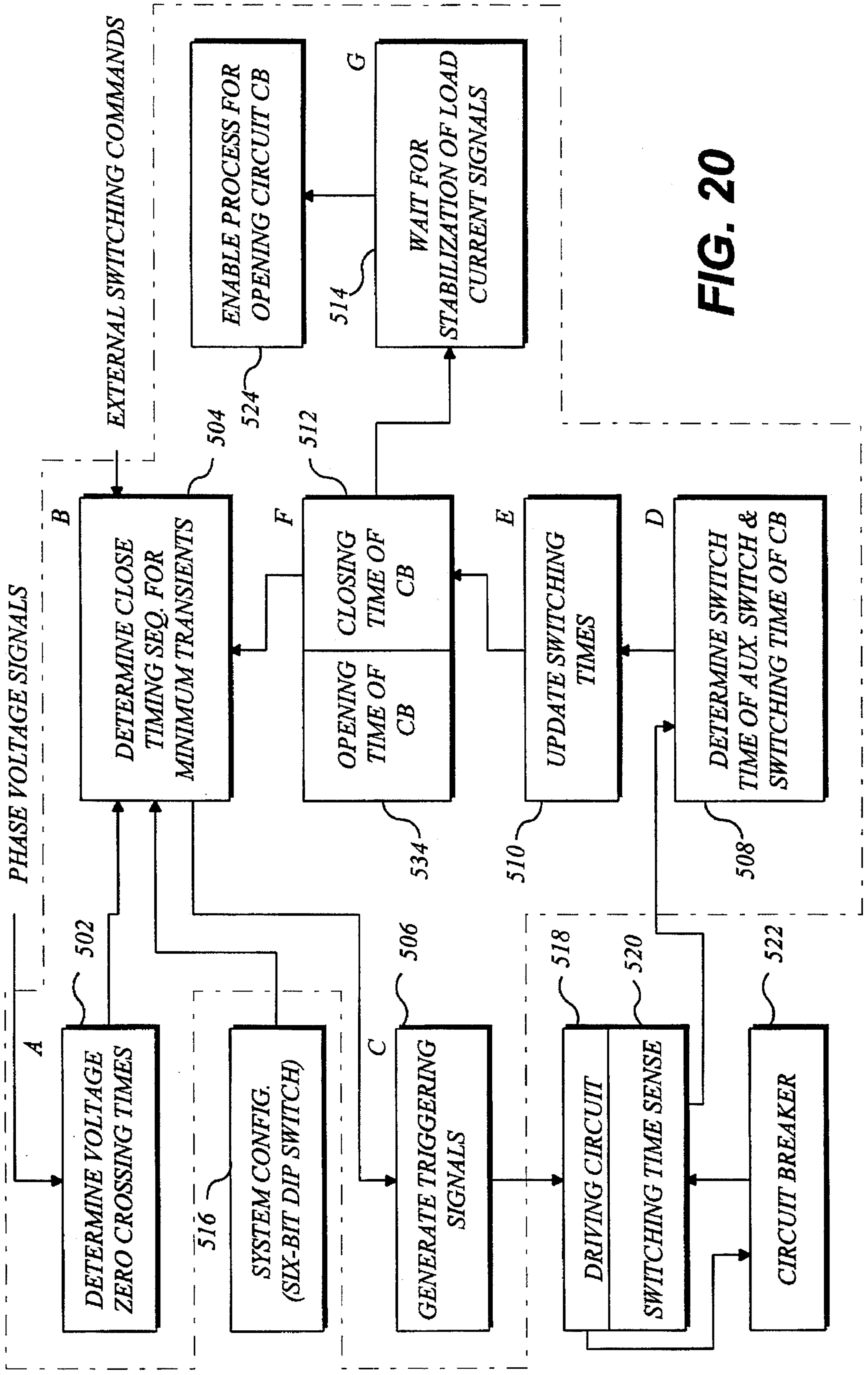
FIG. 20 is a block diagram illustrating the functional elements of the embodiment of FIGS. 15A and 19 during closing of the circuit breaker.

To further assist in understanding the logic implemented by the microcontroller of adaptive sequential controller 480, the relationship between the functional elements of the adaptive sequential controller system and the process implemented when closing a circuit breaker are shown in FIG. 20. Corresponding information involved in opening a circuit breaker are disclosed in FIG. 21. Referring first to FIG. 20, it should be noted that the order in which the steps occur are generally indicated by the letters A through G. Beginning at a block 502, the voltage signal provided by the PT on at least one phase of the distribution line are used to determine the voltage zero crossings. In a block 504, the microcontroller responds to an external switching command to close the circuit breaker; it determines the closing timing sequence necessary to achieve minimum transients on the line, corresponding to closing at a zero voltage crossing, or to minimize inrush current to an inductive load, corresponding to closing at the peak of the voltage waveform. To carry out this determination, the microcontroller employs the data provided by the system configuration 6-bit dip switch, as noted in a block 516. Also incorporated in the determination is the previous closing response time of the circuit breaker, as indicated in a block 512. Based upon these input data, triggering signals are generated (as noted in a block 506) to initiate closing the circuit breaker at the appropriate instant selected to compensate for the delayed closing response time of the circuit breaker, so that it closes as the phase voltage crosses through zero, thereby producing minimum transients or inrush current on the line (and/or producing minimum switching energy).

The triggering signals are applied to a driving circuit, as indicated in a block 518, which provides the current to energize the closing coil within the circuit breaker in a block 522. Block 522 is functionally coupled to switching-time sense circuitry (in a block 520), and the auxiliary switch response time to the close signal is used in a block 508 to determine the switching time of the primary switch in the circuit breaker. Using this response time of the circuit breaker to the close signal that was just determined, the switching time for each phase (in a multi-phase system) is updated, in accordance with a block 510, so that it can be available to determine when the close triggering signal should be generated at the next time that the circuit breaker is closed. Having closed the circuit breaker, the microcontroller then waits the load current signal stabilize, as indicated in a block 514. Thereafter, the adaptive sequential controller is prepared to open the circuit breaker, as indicated in FIG. 21.

Figure 21:
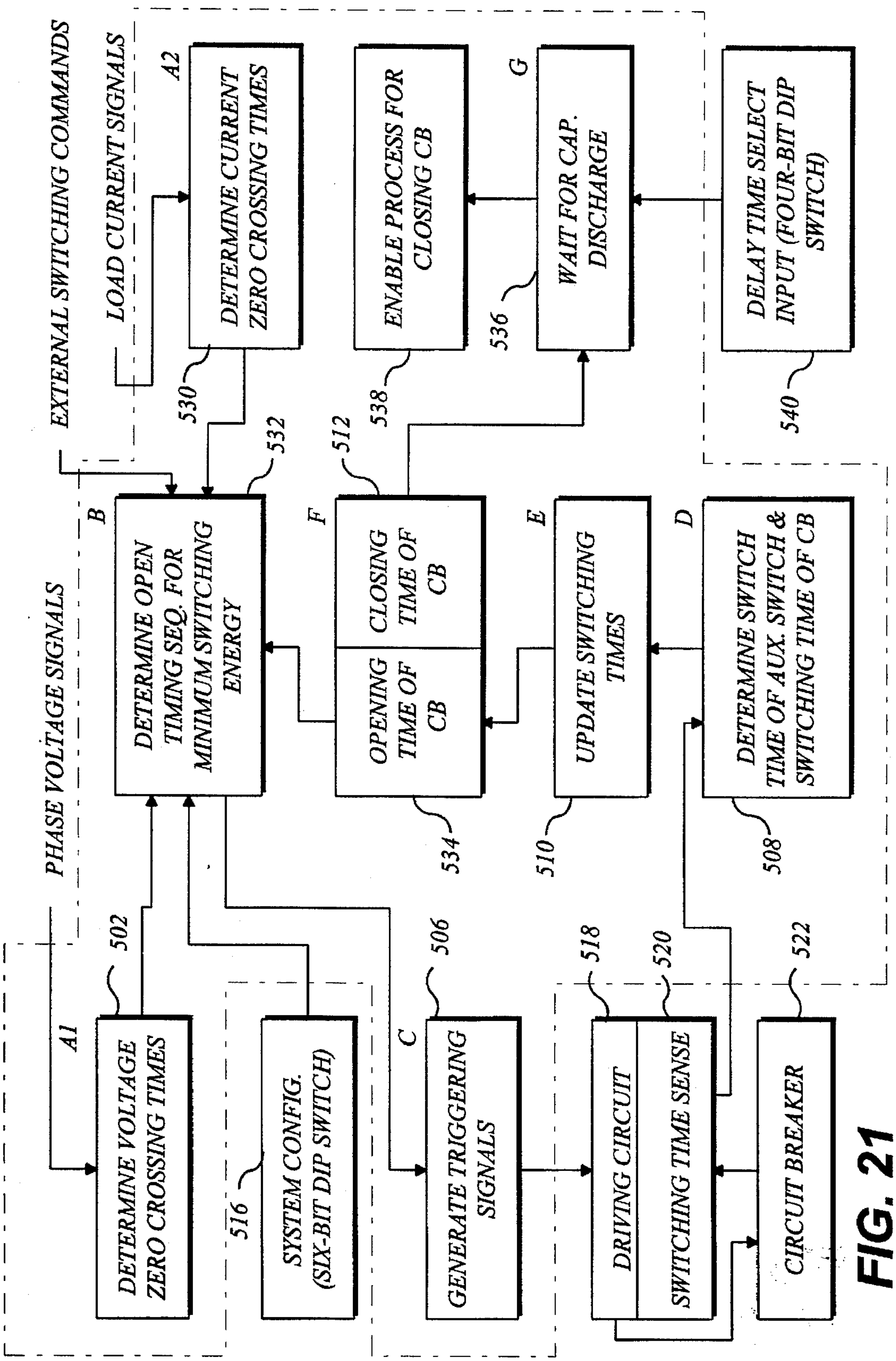
FIG. 21 is a block diagram showing the corresponding functional elements of the embodiment of FIGS. 15A and 19 during opening of the circuit breaker.

Referring to FIG. 21, it will be noted that several of the functional blocks discussed above in connection with closing the circuit breaker also appear in the following discussion regarding opening the circuit breaker. To determine when the open triggering signal should be generated to achieve minimum switching energy, more information is required than was necessary to minimize transients when the circuit breaker was closed. In addition to determining the voltage zero crossing time(s) in block 502, when opening the circuit breaker, the microcontroller must also either obtain the current signal(s) from any CT(s) installed on the distribution line in a block 530, or the relationship between current zero crossing and voltage zero crossing times must be determined based upon a known load power factor (which presumably remains relatively constant). In a block 532, the microcontroller determines the open timing sequence that should be applied in controlling the circuit breaker to achieve minimum switching energy. Again, this determination requires the data from the system configuration 6-bit dip switch, which indicates the number of PTs, CTs, and the configuration of the circuit breaker being controlled. Further, to determine the appropriate instant at which the open triggering signal should be generated, the microcontroller makes use of the previous opening response time of the circuit breaker, referring to a block 534. Having determined the opening timing sequence necessary to minimize switching energy based on these parameters and on the known characteristics of the circuit breaker (i.e., its withstand voltage), the microcontroller generates the triggering signals for opening the circuit breaker in block 506; these triggering signals are applied to the driving circuit in block 518. The driving circuit then energizes the open coil of the circuit breaker, causing it to open the circuit breaker primary switch(es) at the appropriate time(s) to minimize the switching energy. The response time(s) of the auxiliary switch(es) to the current applied to the open coil is monitored in block 508, and the corresponding response time(s) of the primary switch(es) is updated in block 510, to be available the next time that the circuit breaker is opened.

Before the circuit breaker can again be closed, it is necessary to wait for any capacitive load that is coupled to it to discharge, as noted in a block 536. The time that the microcontroller waits for the capacitive load to discharge is determined by the delay time setting of the 4-bit dip switch, as noted in a block 540. Having waited for the appropriate time, the microcontroller then enables the steps discussed above for closing the circuit breaker, as referenced in a block 538.

While the preferred embodiments of the invention have been illustrated and described with respect to several variations that can be provided, it will be appreciated that other changes can be made therein without departing from the spirit and scope of the invention. Accordingly, it is not intended that the present invention in any way be limited by the specification, but instead, that the scope of the invention be entirely determined by reference to the claims that follow.

The embodiments of the invention in which an exclusive property or privilege is claimed are defined as follows:

1. An adaptive sequential controller for controlling a switching device to interrupt and enable electrical current flow through an alternating current (AC) power line, comprising:

(a) transformer means, couplable to the power line, for producing a timing signal indicative of a zero crossing of at least one of a periodically varying current and a periodically varying voltage on the power line;

(b) switching-time sensing means, couplable to an auxiliary switch within the switching device, for producing a response signal indicative of a time interval required for the switching device to open or dose after being activated;

(c) delay adjustment means, coupled to the switching-time sensing means to receive the response signal and coupled to the transformer means to receive the timing signal, for producing a triggering signal relative to the timing signal and as a function of the response signal, after receipt of an externally produced switching command; and (d) control means, coupled to the delay adjustment means to receive the triggering signal, for producing control signals in response thereto, said control signals activating the switching device to cause it to enable and interrupt the electrical current flow through the power line, said triggering signal determining a time at which the control means produce the control signals for initiating interruption and enablement of electrical current flow through the power line by the switching device so as to adaptively compensate for changes within the switching device that affect its response time and to ensure that the switching device opens and closes at a desired relative value of at least one of the periodically varying current and the periodically varying voltage on the power line.

2. The adaptive sequential controller of claim 1, wherein the auxiliary switch opens and closes substantially in concert with primary contacts of the switching device, any differences in operating times of the auxiliary switch and the primary contacts of the switching device being predefined, so that a response time of the auxiliary switch is indicative of the response time of the primary contacts of the switching device.

3. The adaptive sequential controller of claim 2, wherein the control means and the delay adjustment means comprise a microcomputer that includes a memory in which are stored:

(a) program instructions that control the microcomputer; and (b) the differences in operating times of the auxiliary switch and the primary contacts of the switching device.

4. The adaptive sequential controller of claim 1, wherein the transformer means comprise both a potential transformer and a current transformer, further comprising load power factoring determining means, coupled to the current and potential transformer, for determining a power factor of the load, and thus, a phase angle between the periodically varying current and voltage on the power line, said phase angle being subject to variation due to a varying reactive or inductive load on the power line, said control means compensating for variations in the phase angle in producing the control signal to open and close the switching device.

5. The adaptive sequential controller of claim 1, wherein the delay adjustment means produce the triggering signal at a time selected to minimize switching energy in the switching device.

6. The adaptive sequential controller of claim 1, wherein the delay adjustment means produce the triggering signal to actuate said switching device at a time selected to minimize transients on the power line.

7. The adaptive sequential controller of claim 1, further comprising a normally-open relay disposed in series with and between the control means and the switching device, said normally-open relay being closed in response to the externally produced switching command before the control means initiate enablement of electrical current flow through the power line, said normally-open relay protecting against a component failure that would enable electrical current to flow in the power line other than in response to the externally produced switching command.

8. The adaptive sequential controller of claim 1, wherein the transformer means comprise a potential transformer, and the timing signal comprises a voltage signal that is produced by the potential transformer, said voltage signal being indicative of zero crossings of the voltage on the power line.

9. The adaptive sequential controller of claim 1, wherein the delay adjustment means are coupled to the transformer means and to the switching-time sensing means to receive the timing signal and the response signal as light signals via optical fibers, and wherein the control means receive the externally produced switching commands as light signals via an optical fiber, the delay adjustment means and the control means being thereby electrically isolated from possibly damaging external electrical signals.

10. The adaptive sequential controller of claim 9, further comprising a plurality of optical interfaces for converting the light signals to electrical signals.

11. The adaptive sequential controller of claim 1, wherein the delay adjustment means produce the triggering signal to actuate said switching device at a time selected to minimize inrush current to an inductive load on the power line.

12. An adaptive sequential controller for controlling a switching device that is disposed on an AC power line so as to ensure that the switching device responds to a switching signal so as to achieve a substantially minimum switching energy, comprising:

(a) a potential transformer couplable to the power line, said potential transformer producing a potential signal indicative of zero crossings of a periodic electrical voltage on the power line;

(b) switching-time sensing means, couplable to an auxiliary switch within the switching device, for determining a response time of the switching device after it is activated to enable or interrupt current flow in the AC power line, said auxiliary switch being linked to primary contacts of the switching device that carry line current on the AC power line when closed and having a response time that is indicative of the response time of the primary contacts of the switching device; and (c) control means, coupled to the potential transformer to receive the potential signal and to the switching-time sensing means to determine the response time of the switching device, for activating the switching device in response to an externally produced switching command after a compensatory delay and for determining said compensatory delay so that said minimum switching energy is achieved when the switching device operates, said switching-time sensing means enabling the control means to produce a control signal that activates the switching device at a time appropriate to compensate for any changes in the response time of the primary contacts of the switching device.

13. The adaptive sequential controller of claim 12, further comprising transient detector means for detecting transients on the power line that occur when the flow of the electrical current in the power line is enabled by closure of the switching device, said transient detector means producing a transient signal indicative of the time that any such transient occurs, said control means being coupled to the transient detector means to receive the transient signal and responding thereto in determining said compensatory delay that is applied when the switching means are next activated by the control means to enable the flow of the electrical current in the power line.

14. The adaptive sequential controller of claim 13, wherein the control means determine the compensatory delay so as to minimize transients on the power line when closing the switching device and determines the compensatory delay so as to achieve minimum switching energy in the switching device when opening the switching device.

15. The adaptive sequential controller of claim 12, further comprising a current transformer that is couplable to the power line, and phase angle determinative means for determining a phase angle between a periodic electrical current flowing through the power line and the voltage on the power line, wherein said control means determine the compensatory delay used in activating the switching device as a function of the phase angle.

16. The adaptive sequential controller of claim 12, wherein the control means stores a load power factor that defines a phase angle between a periodic electrical current flowing the power line and the voltage on the power line, and wherein said control means determine the compensatory delay for opening the switching device as a function of the phase angle.

17. The adaptive sequential controller of claim 12, wherein the control means in part achieve the minimum switching energy by determining the compensatory delay so as to ensure that a withstand voltage of the primary contacts in the switching device is greater than a voltage developed across the primary contacts as they open, so that a restrike arc between the primary contacts does not occur.

18. The adaptive sequential controller of claim 12, further comprising an electrically actuated switch disposed within the switching device and coupled to the control means to receive the control signal, and responsive thereto, said electrically actuated switch conveying an electrical current to operate the switching device in response to the control signal.

19. The adaptive sequential controller of claim 18, further comprising a relay disposed in series with the electrically actuated switch, the relay being closed by the control means before the control signal is applied to the electrically actuated switch, said relay ensuring that a fault in the electrically actuated switch does not enable operation of the switching device in the absence of the switching command.

20. The adaptive sequential controller of claim 19, further comprising means for setting a delay time, said control means being coupled to the means for setting the delay time, wherein the control means delay producing the control signal to dose the switching device after it has been opened until the delay time has elapsed.

21. The adaptive sequential controller of claim 12, further comprising a temperature sensor that is disposed to determine a temperature affecting the delay of the switching device in responding to the control signal and producing a temperature signal indicative of said temperature, said control means being coupled to the temperature sensor to receive the temperature signal and modifying the compensatory delay as a function of the temperature signal to compensate it for said temperature.

22. The adaptive sequential controller of claim 12, further comprising a humidity sensor that is disposed to determine an ambient humidity affecting the delay of the switching device in responding to the control signal and producing a humidity signal indicative of said humidity, said control means being coupled to the humidity sensor to receive the humidity signal and modifying the compensatory delay as a function of the humidity signal to compensate for said humidity.

23. The adaptive sequential controller of claim 12, further comprising a barometric pressure sensor that is disposed to determine a barometric pressure affecting the delay of the switching device in responding to the control signal and producing a barometric pressure signal indicative of said barometric pressure, said control means being coupled to the barometric pressure sensor to receive the barometric pressure signal and modifying the compensatory delay as a function of the barometric pressure signal to compensate for said barometric pressure.

24. The adaptive sequential controller of claim 12, further comprising current regulator means to regulate an electrical current supplied to activate the switching device, said control signal controlling the flow of the electrical current that is supplied to the switching device to initiate the operation of the switching device, said current regulator means substantially minimizing electrical current fluctuations that might affect and change the inherent time delay of the switching device in responding to the switching signal.

25. The adaptive sequential controller of claim 12, wherein the switching device controls current flow on a plurality of phases of the AC power line, said power line having a substantially balanced load on the plurality of phases so that a predefined phasal relationship exists between the zero crossings of the periodic electrical voltage on each phase of said power line, said control means determining the time to initiate the operation of each phase of said power line based upon the compensatory delay and supplying the control signal for each phase further delayed in accordance with the predefined phasal relationship between the plurality of phases.

26. The adaptive sequential controller of claim 12, wherein the switching device controls current flow on a plurality of phases of the AC power line, said power line having a substantially imbalanced load on the plurality of phases, further comprising a separate potential transformer for each of the plurality of phases, and a separate current transformer for each of the plurality of phases, said control means being coupled to receive a plurality of potential and current signals respectively from the plurality of potential and current transformers, wherein said control means initiate operation of the switching device to enable and interrupt current flow in each of the plurality of phases based upon a compensatory delay appropriate to achieve the minimum switching energy in each phase of the switching device, separate primary contacts for each phase being activated by separate control signals produced by the control means.

27. The adaptive sequential controller of claim 12, wherein the control means are selectively switchable to control different configurations of switching devices.

28. The adaptive sequential controller of claim 12, wherein the control means actuate the switching device to close when the periodically varying voltage on the power line is at a peak to minimize inrush current to an inductive load coupled to the power line.

29. A method for controlling a switching device disposed on a power line to ensure that primary contacts of the switching device open and close at desired points in one of a periodically varying electrical current and a periodically varying voltage of the power line, said switching device having primary contacts and a corresponding auxiliary switch that is mechanically linked to the primary contacts, comprising the steps of:

(a) producing a timing signal synchronized to zero crossings of at least one of the periodically varying electrical current flowing in the power line and the periodically varying voltage on the power line;

(b) producing a switch signal indicating when the auxiliary switch opens and closes;

(c) determining a response time for the primary contacts of the switching device when activated by a control signal, based upon both:

(i) a time difference between activation of the switching device with the control signal and a change of state of the switch signal, and (ii) any difference between a response of the auxiliary switch and the primary contacts to the control signal;

(d) producing an adjusted delay signal as a function of the response time and the timing signal; and (e) initiating operation of the switching device in response to an externally produced switching command, at a time adaptively determined as a function of the adjusted delay signal said time being determined so as to ensure that the switching device enables and interrupts the flow of electrical current through the power line at said desired point in said one of the periodically varying potential and the periodically varying electrical current flow in the power line, any changes in the response time of the primary contacts of the switching device being compensated by varying said time at which operation of the switching device is next initiated after receipt of the externally produced switching command.

30. The method of claim 29, further comprising the steps of producing a phase angle signal indicating a phase angle between the current flowing in the power line and its voltage; and modifying the adjusted delay signal as a function of the phase angle signal.

31. The method of claim 29, wherein the desired point on said one of the periodically varying potential and the periodically varying electrical current flow in the power line is determined so as to minimize switching energy.

32. The method of claim 29, wherein the desired point on said one of the periodically varying potential and the periodically varying electrical current flow in the power line is determined so as to minimize transients on the power line that might be caused by activation of the switching device.

33. The method of claim 29, wherein the desired point on said one of the periodically varying potential and the periodically varying electrical current flow in the power line is determined so as to minimize transients on the power line that might be caused by closure of the switching device and so as to minimize switching energy in the switching device when it opens.

34. The method of claim 29, further comprising the step of closing a relay in response to the switching command, but prior to initiating operation of the switching device, closure of said relay being required to enable operation of the switching device, thereby preventing a fault from causing electrical current flow on the power line in the absence of the switching command.

35. The method of claim 34, further comprising the step of delaying operation of the switching device after receipt of the switching command, to ensure that the relay closes before the step of initiating operation of the switching device in response to the switching command occurs.

36. The method of claim 29, further comprising the steps of sensing an ambient temperature; and adjusting the time at which the operation of the switching device is initiated as a function of said temperature to compensate for changes in the inherent delay of the switching device due to said temperature.

37. The method of claim 29, further comprising the steps of sensing an ambient humidity; and adjusting the time at which the operation of the switching device is initiated as a function of said humidity to compensate for changes in the inherent delay of the switching device due to said humidity.

38. The method of claim 29, further comprising the steps of sensing a barometric pressure; and adjusting the time at which the operation of the switching device is initiated as a function of said barometric pressure to compensate for changes in the inherent delay of the switching device due to said barometric pressure.

39. The method of claim 29, further comprising the step of transmitting the timing signal and the switch signal as light signals to provide electrical isolation.

40. The method of claim 29, further comprising the steps of regulating an electrical current supplied to activate the switching device; and controlling the flow of the electrical current to the switching device to control initiation of the operation of the switching device, thereby substantially minimizing electrical current fluctuations that might otherwise affect and change the inherent time delay of the switching device in responding to the switching signal.

41. The method of claim 29, wherein the switching device controls current flow on a plurality of phases of the power line, said power line having a substantially balanced load on the plurality of phases so that a predefined phase relationship exists between the zero crossings of the periodic electrical voltage on each phase of said power line, further comprising the step of determining the time to initiate the opening and closing of each phase of said switching device in accordance with the predefined phasal relationship between the plurality of phases.

42. The method of claim 29, wherein the switching device controls current flow on a plurality of phases of the power line, said power line having a substantially imbalanced load on the plurality of phases, further comprising the steps of determining the phasal relationship of the power line and the phase angle between the periodically varying potential and periodically varying current; and initiating operation of the switching device for each phase separately and independently, to accommodate differences in phase angles between the voltage and current on each phase and different phase angles on each phase.

43. The method of claim 29, wherein closure of the switching device is initiated at a peak of the periodically varying potential on the power line to minimize inrush current to an inductive load.

44. A method for controlling a switching device that enables and interrupts electrical current flow in a power line, comprising the steps of:

(a) detecting a zero crossing of one of a periodically varying potential and a periodically varying electrical current on the power line to produce a reference signal;

(b) monitoring a response time of the switching device following receipt of a control signal that activates it, said response time being subject to change over time; and (c) in response to an externally produced command signal, activating the switching device with the control signal after a compensatory delay has elapsed, said compensatory delay being determined as a function of the reference signal and of the response time of the switching device, so as to achieve a substantially minimum switching energy.

45. The method of claim 44, wherein the step of monitoring the response time of the switching device includes the step of monitoring a response time of auxiliary contacts in the switching device when the switching device is activated with the control signal, said auxiliary contacts being mechanically linked to primary contacts of the switching device that carry the periodically varying electrical current of the power line when closed.

46. The method of claim 44, wherein the minimum switching energy is achieved during opening of the switching device.

47. The method of claim 44, wherein the minimum switching energy is achieved by activating the switching device at a time selected to ensure a voltage across contacts of the switching device does not exceed a withstand voltage of the switching device.

48. The method of claim 44, further comprising the steps of monitoring transients on the power line; and closing the switching device at a time determined to minimize said transients, and opening the switching device at a time selected to achieve the minimum switching energy.

49. The method of claim 44, further comprising the steps of monitoring a phase angle between the periodically varying potential and the periodically varying electrical current flowing on the power line; and modifying the time at which the switching device is activated to minimize the switching energy as a function of the phase angle.

50. The method of claim 44, further comprising the step of activating the switching device to close with the control signal after a compensatory delay has elapsed, in response to the externally produced command signal, said compensatory delay being determined as a function of the reference signal and of the response time of the switching device, so as to achieve a substantially minimum inrush current to an inductive load on the power line.

* * * * *

UNITED STATES PATENT AND TRADEMARK OFFICE

CERTIFICATE OF CORRECTION

PATENT NO. : 5,644,463

DATED : July 1, 1997

INVENTOR(S) : El-Sharkawi et al.

It is certified that error appears in the above-indentified patent and that said Letters Patent is hereby corrected as shown below:

On title page,

| | |
|---|---|
| Section [56], Other Publications, 4th Reference | "synchrounous" should read --synchronous-- |
| Section [56], Other Publications, 6th Reference | "Dustribution" should read --Distribution-- |
| Column 6, line 23 | "alter" should read --after-- |
| Column 10, line 17 | "filling" should read --falling-- |
| Column 11, line 14 | "dock" should read --clock-- |
| Column 13, line 27 | "doses" should read --closes-- |
| Column 13, line 60 | "$\tau_l + \tau_{adp} \leq T$" should read -- $\tau_l + \tau_{adp} \geq T$ -- |
| Column 17, line 5 | "dose" should read --close-- |
| Column 17, line 40 (Equation 1) | "$\int_{t_0}^{t_1} i(i) * v(t)dt$" should read -- $\int_{t_0}^{t_1} i(t) * v(t)dt$ -- |
| Column 18, line 30 | "to" should read -- $t_0$ -- |
| Column 19, line 12 | after "above." begin a new paragraph |
| Column 20, line 15 | "micro controller" should read --microcontroller-- |
| Column 23, lines 35-36 | "breaker (s)" should read --breaker(s)-- |
| Column 24, lines 49-50 | "breaker (s)" should read --breaker(s)-- |
| Column 27, line 4 | after "energy." begin a new paragraph |
| Column 27, line 39 (Claim 1, line 12) | "dose" should read --close-- |
| Column 30, line 17 (Claim 20, line 5) | "dose" should read --close-- |
| Column 31, line 52 (Claim 29, line 28) | "signal" should read --signal,-- |

Signed and Sealed this

Twenty-fourth Day of February, 1998

*Attest:*

BRUCE LEHMAN

*Attesting Officer*

*Commissioner of Patents and Trademarks*